United States Patent
Arora et al.

(10) Patent No.: US 11,704,874 B2
(45) Date of Patent: Jul. 18, 2023

(54) SPATIAL INSTRUCTIONS AND GUIDES IN MIXED REALITY

(71) Applicant: Magic Leap, Inc., Plantation, FL (US)

(72) Inventors: Tushar Arora, Hollywood, FL (US); Scott Kramarich, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 302 days.

(21) Appl. No.: 16/987,144

(22) Filed: Aug. 6, 2020

(65) Prior Publication Data

US 2021/0043005 A1 Feb. 11, 2021

Related U.S. Application Data

(60) Provisional application No. 62/894,448, filed on Aug. 30, 2019, provisional application No. 62/884,153, filed on Aug. 7, 2019.

(51) Int. Cl.
*G06T 19/00* (2011.01)
*H04W 4/024* (2018.01)
*G06F 3/01* (2006.01)

(52) U.S. Cl.
CPC ............ *G06T 19/006* (2013.01); *G06F 3/011* (2013.01); *H04W 4/024* (2018.02)

(58) Field of Classification Search
CPC ....... G06T 19/006; G06F 3/011; H04W 4/024
See application file for complete search history.

(56) References Cited

U.S. PATENT DOCUMENTS

| | | | |
|---|---|---|---|
| 4,852,988 A | 8/1989 | Velez | |
| 6,433,760 B1 | 8/2002 | Vaissie | |
| 6,491,391 B1 | 12/2002 | Blum | |
| 6,847,336 B1 | 1/2005 | Lemelson | |
| 6,943,754 B2 | 9/2005 | Aughey | |
| 6,977,776 B2 | 12/2005 | Volkenandt et al. | |

(Continued)

FOREIGN PATENT DOCUMENTS

| | | |
|---|---|---|
| CA | 2316473 A1 | 1/2001 |
| CA | 2362895 A1 | 12/2002 |
| CA | 2388766 A1 | 12/2003 |

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

(Continued)

*Primary Examiner* — Ryan R Yang
(74) *Attorney, Agent, or Firm* — Morrison & Foerster LLP

(57) ABSTRACT

Exemplary systems and methods for creating spatial contents in a mixed reality environment are disclosed. In an example, a location associated with a first user in a coordinate space is determined. A persistent virtual content is generated. The persistent virtual content is associated with the first user's associated location. The first user's associated location is determined and is associated with the persistent virtual content. A location of a second user at a second time in the coordinate space is determined. The persistent virtual content is presented to the second user via a display at a location in the coordinate space corresponding to the first user's associated location.

20 Claims, 20 Drawing Sheets

(56) References Cited

U.S. PATENT DOCUMENTS

| | | | |
|---|---|---|---|
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,733,927 B1 | 5/2014 | Lewis | |
| 8,733,928 B1 | 5/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-Zeev et al. | |
| 9,658,473 B2 | 5/2017 | Lewis | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,185,147 B2 | 1/2019 | Lewis | |
| 10,375,009 B1 | 8/2019 | Fishman | |
| 10,467,809 B2* | 11/2019 | Khalid | H04N 21/8456 |
| 10,580,218 B1* | 3/2020 | Viner | G06T 19/006 |
| 10,665,028 B2* | 5/2020 | Simari | G06T 19/20 |
| 10,937,249 B2* | 3/2021 | Lynen | G06F 3/011 |
| 10,937,391 B2* | 3/2021 | Griswold | G06T 19/00 |
| 2003/0030597 A1 | 2/2003 | Geist | |
| 2006/0023158 A1 | 2/2006 | Howell et al. | |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2014/0195918 A1 | 7/2014 | Friedlander | |
| 2015/0168731 A1 | 6/2015 | Robbins | |
| 2015/0215351 A1 | 7/2015 | Barzuza | |
| 2015/0235451 A1 | 8/2015 | Schowengerdt | |
| 2017/0243403 A1 | 8/2017 | Daniels | |
| 2019/0107990 A1 | 4/2019 | Spivack et al. | |
| 2019/0287306 A1* | 9/2019 | Wieser | G06T 19/006 |
| 2020/0151961 A1* | 5/2020 | Viner | G06T 19/006 |
| 2020/0160602 A1* | 5/2020 | Ghatak | G06Q 30/0261 |

OTHER PUBLICATIONS

Bimber, Oliver et al. (2005). "Spatial Augmented Reality: Merging Real and Virtual Worlds," A. K. Peters, Ltd., Wellesley, MA.

International Search Report and Written Opinion dated Oct. 29, 2020, for PCT Application No. PCT/US20/45496, filed on Aug. 7, 2020, eighteen pages.

International Preliminary Report and Written Opinion dated Feb. 17, 2022, for PCT Application No. PCT/US2020/045496, filed on Aug. 7, 2020, nine pages.

European Search Report dated Sep. 1, 2022, for EP Application No. 20849667.9, seven pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mount Display", (June 1994).

\* cited by examiner

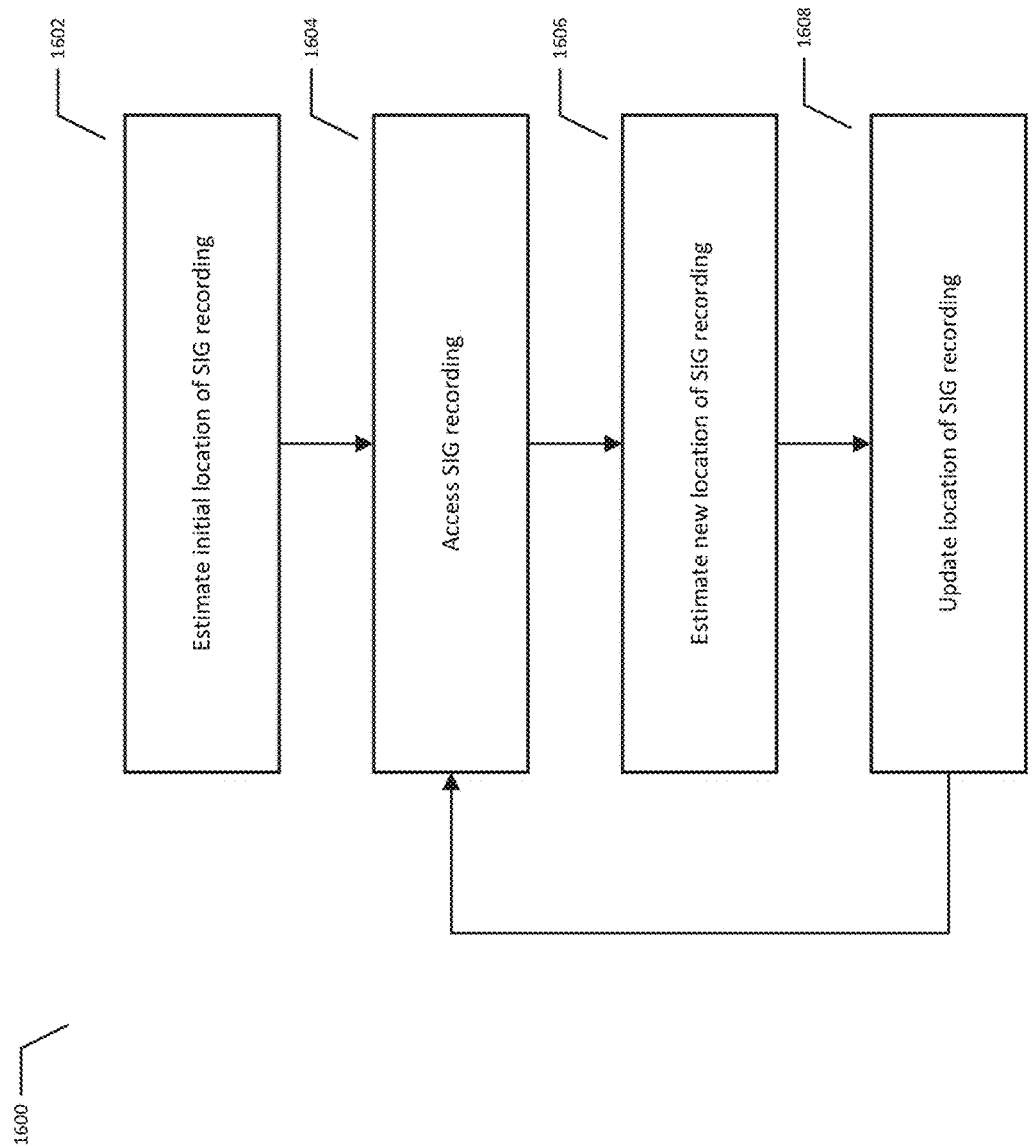

SPATIAL INSTRUCTIONS AND GUIDES IN MIXED REALITY

RELATED APPLICATIONS

This patent application claims priority of U.S. Provisional Patent Application No. 62/884,153 filed on Aug. 7, 2019 and U.S. Provisional Patent Application No. 62/894,448 filed Aug. 30, 2019, which are hereby incorporated by reference in their entirety.

FIELD

This disclosure relates in general to systems and methods for presenting audio and visual signals, and in particular to systems and methods for presenting audio and visual signals corresponding to user-created content in a mixed reality environment

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems may provide the user with various ways in which to interact with a virtual environment; for example, XR systems may include various sensors (e.g., cameras, microphones, etc.) for detecting a user's position and orientation, facial expressions, speech, and other characteristics; and present this information as input to the virtual environment. The interactivity of XR systems can increase the user's engagement as compared to the user's engagement in other virtual environments (e.g., through a 2D screen). Social features can further increase interactivity, such as where XR system users are able to interact with each other or interact with content together. Increased engagement can facilitate better learning or more enjoyable entertainment as the user experiences a closer visual and physical connection to the virtual content.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that incorporate interactive virtual environments for training, educational, or entertainment purposes.

BRIEF SUMMARY

Examples of the disclosure describe systems and methods for creating spatial instructions and guides in a mixed reality environment. In an example method, a first input is received at a first time from a first user. A position of the first user at the first time in a coordinate space is determined using a sensor of a first wearable head device. A persistent virtual content corresponding to the first input is generated. The persistent virtual content is associated with the position of the first user at the first time. A location of the first user is determined. The location of the first user is associated with the persistent virtual content. At a second time, a position of a second user at the second time in the coordinate space is determined. The persistent virtual content is displayed to the second user via a display. Presenting the persistent virtual content to the second user comprises presenting the persistent virtual content at a position in the coordinate space corresponding to the position of the first user at the first time. A location of the second user is determined. The location of the second user is associated with the persistent virtual content. A new location is determined, where the new location is based on the location of the first user and the location of the second user. The new location is associated with the persistent virtual content.

BRIEF DESCRIPTION OF THE DRAWINGS

FIG. 16 illustrates an example of updating a location associated with spatial content in a mixed reality system.

DETAILED DESCRIPTION

Figure 1A:
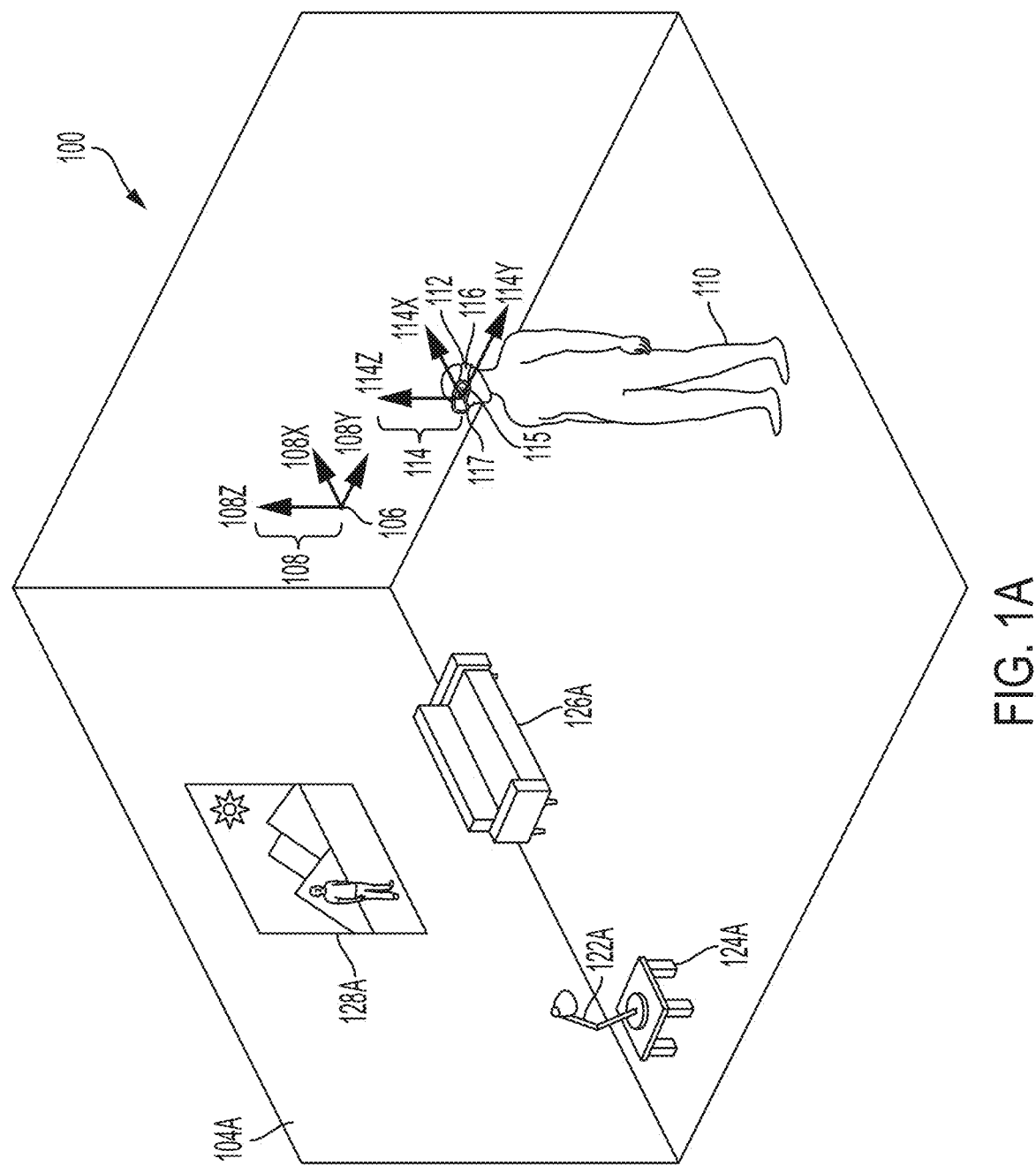
FIGS. 1A-1C illustrate an example mixed reality environment.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
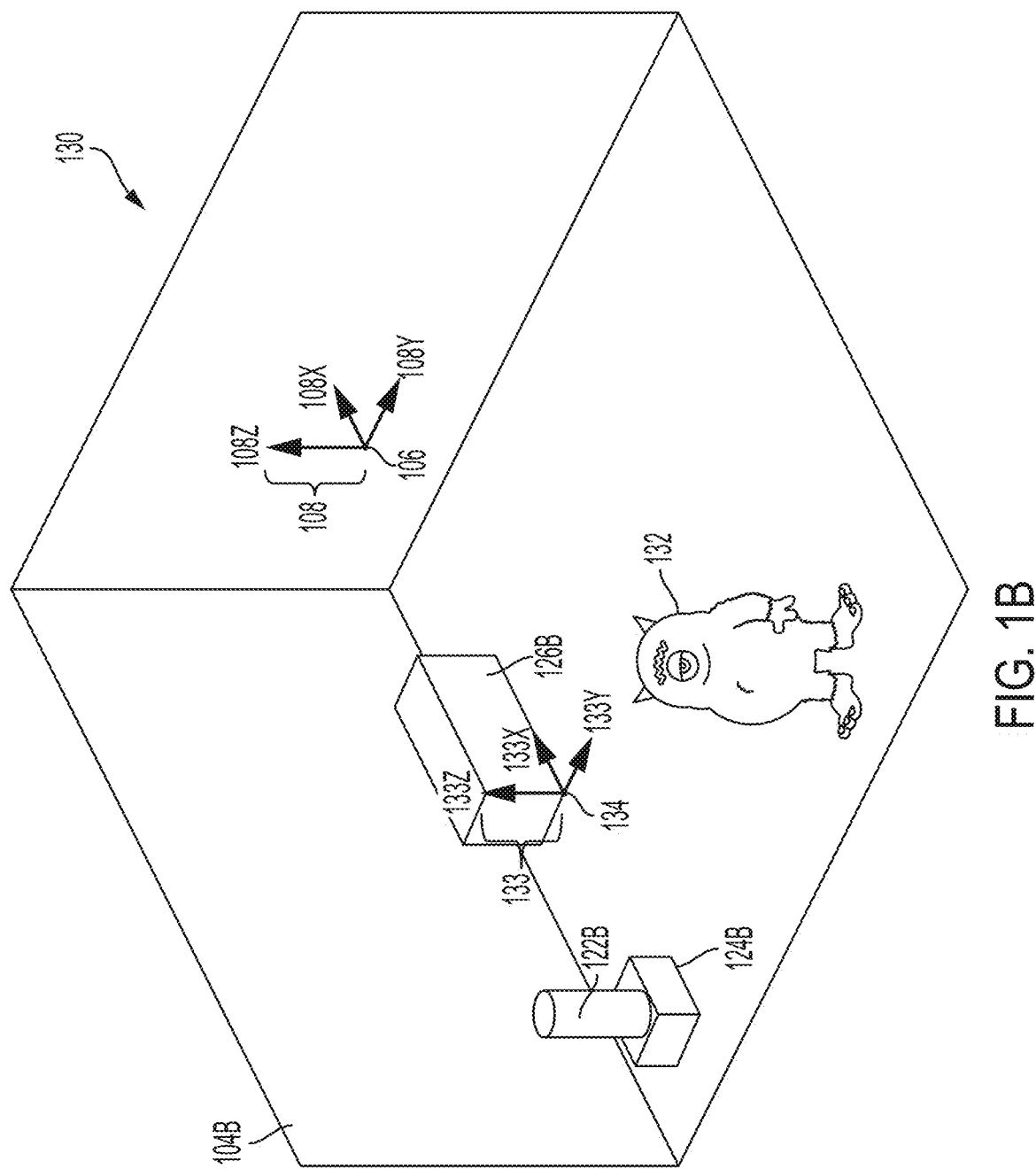

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
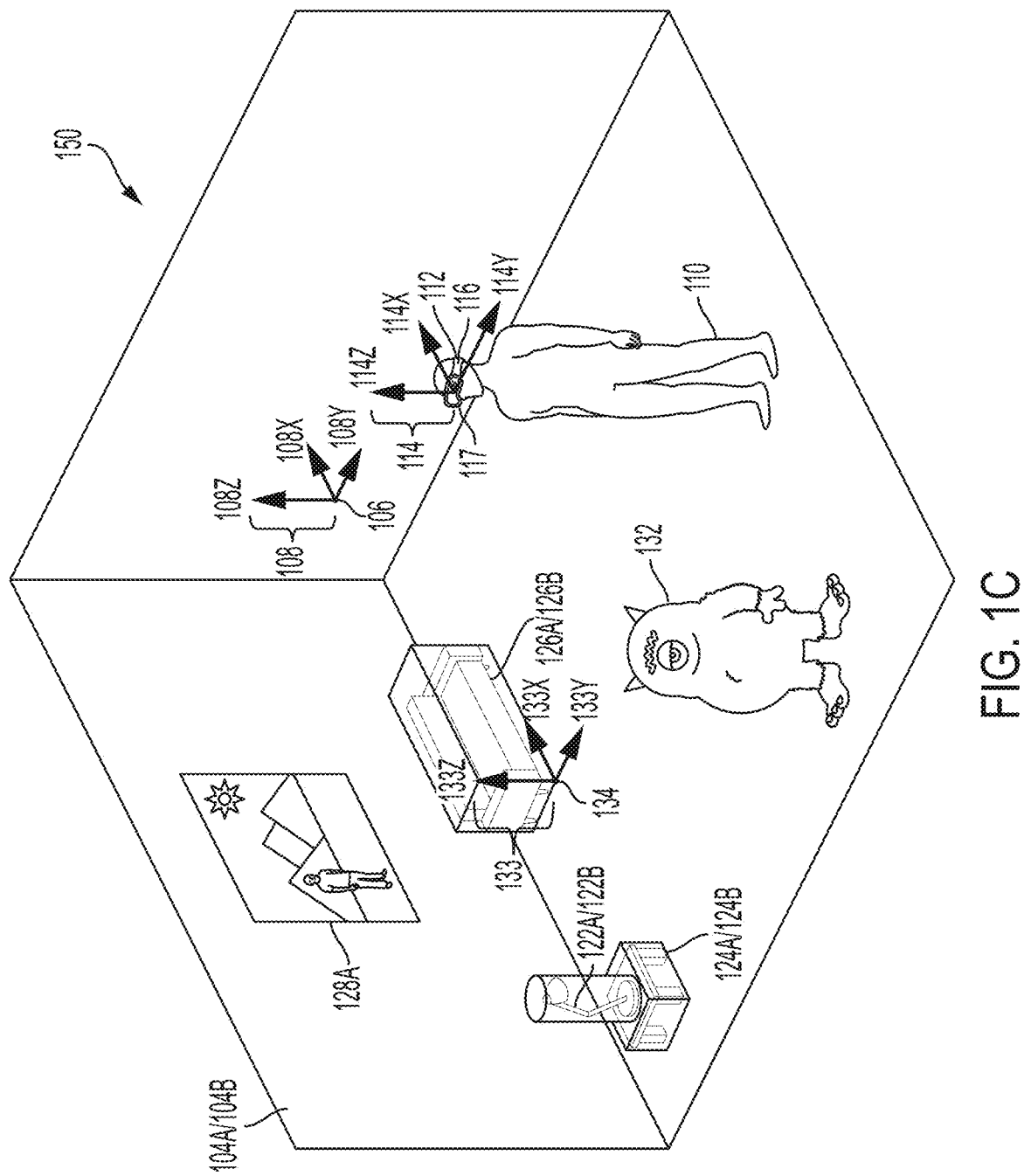

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
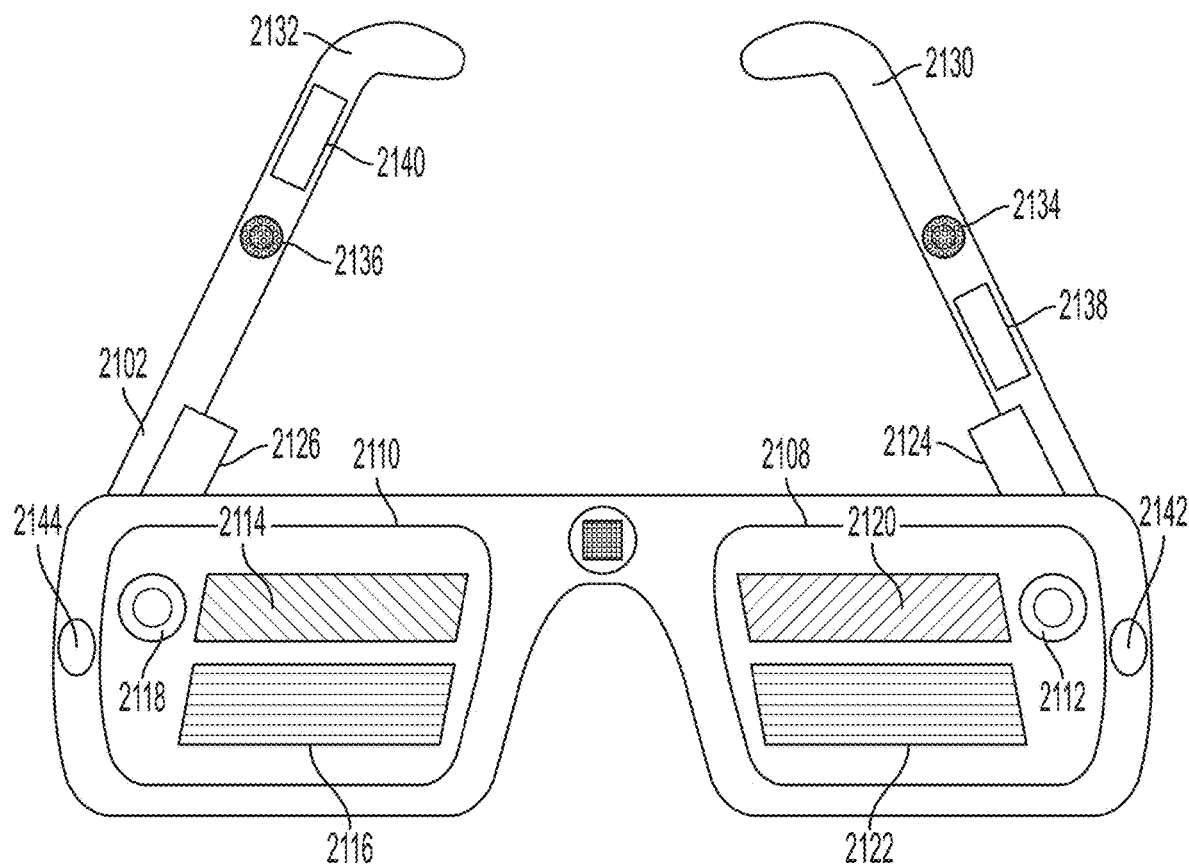
FIGS. 2A-2D illustrate components of an example mixed reality system that can be used to generate and interact with a mixed reality environment.
Figure 2B:
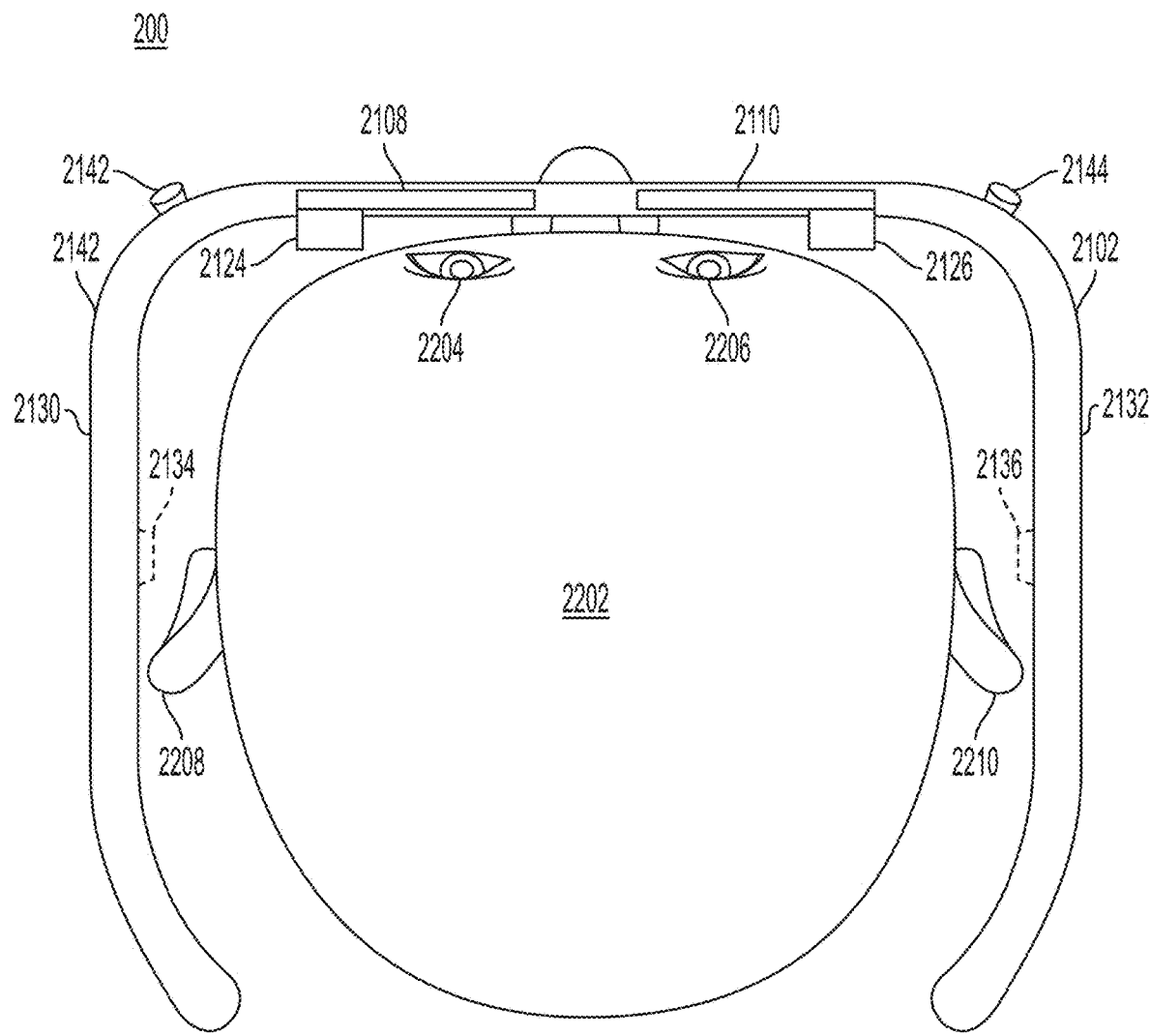
Figure 2C:
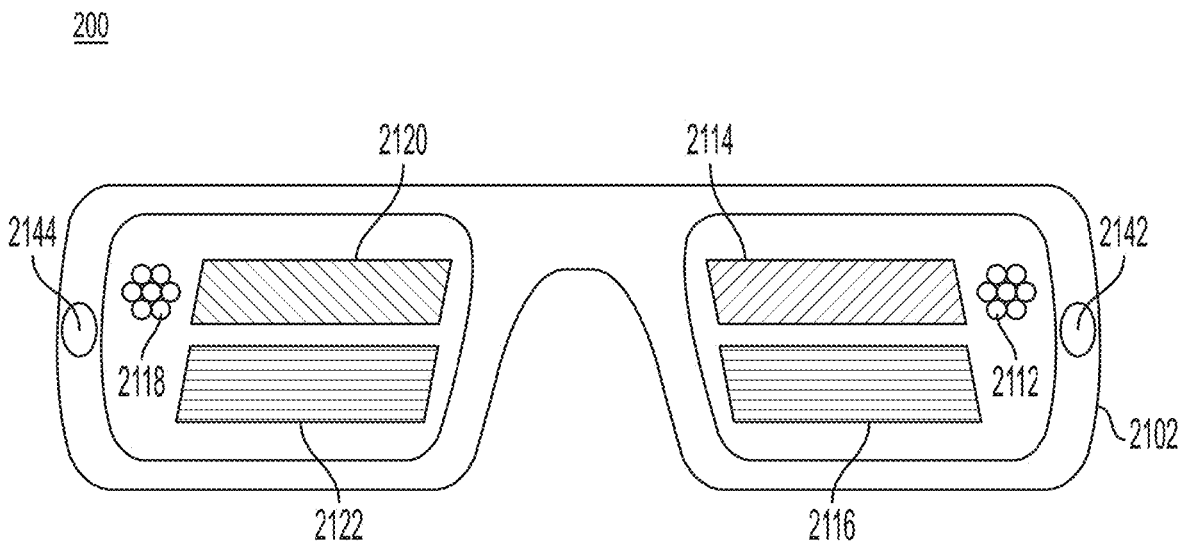
Figure 2D:
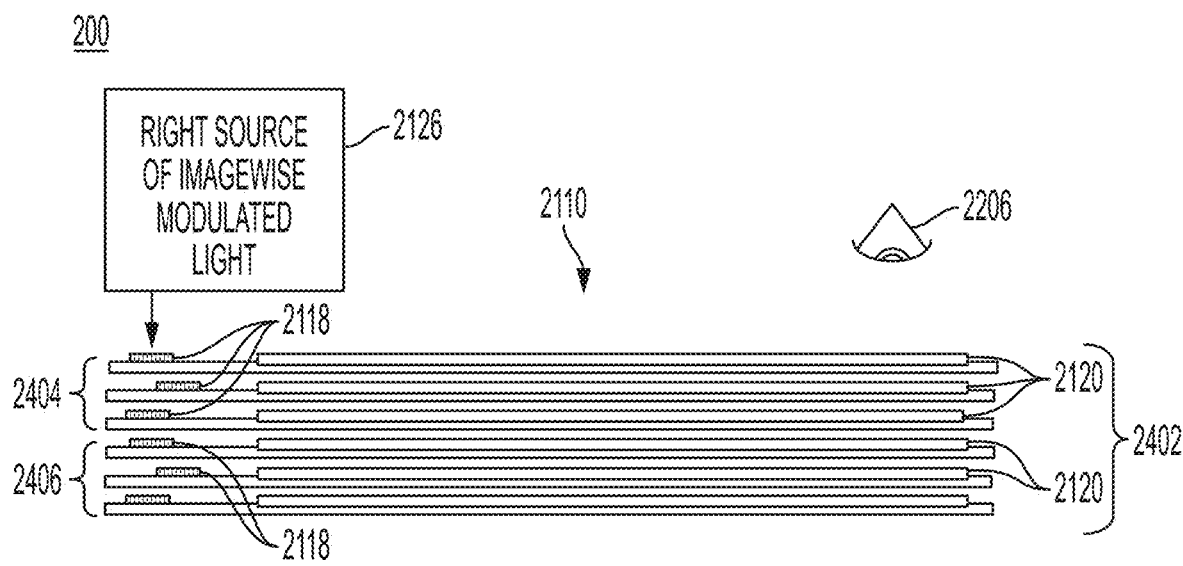

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
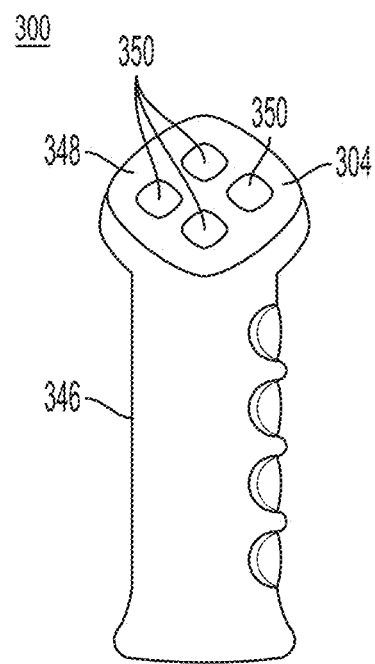
FIG. 3A illustrates an example mixed reality handheld controller that can be used to provide input to a mixed reality environment.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
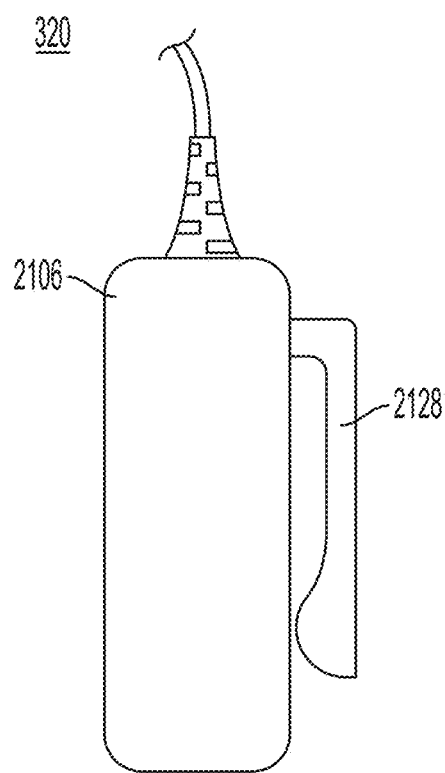
FIG. 3B illustrates an example auxiliary unit that can be used with an example mixed reality system.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
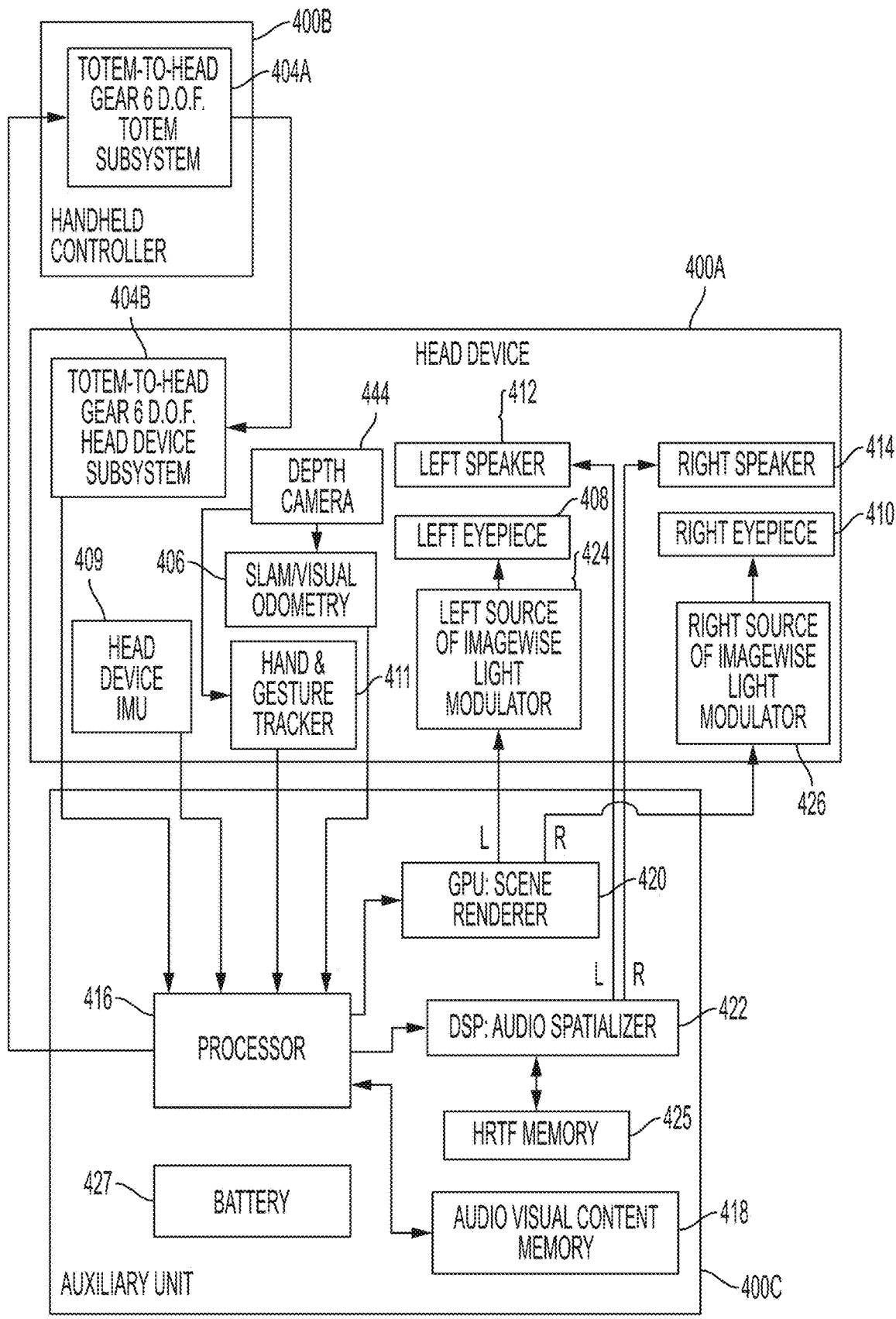
FIG. 4 illustrates an example functional block diagram for an example mixed reality system.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals.

By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Spatial Content

The present disclosure relates to creating and viewing spatial content in a MRE, which can include spatial instructions and guides ("SIG"). According to some embodiments, a user (or more than one user) can "record" spatial content in a MRE, which can be persistently tied to a physical environment in which events were recorded. For example, a user in a room could walk around the room, speak about and point to objects in the room, and draw virtual illustrations in a MRE. A user (either the same user or a different user) could then play the MRE "recording" back. In some embodiments, a user may (during the MRE recording playback) be in the same room that the MRE recording was created. In some embodiments, a user could then watch a virtual representation move around the room, explain and point to objects, and draw virtual illustrations in the MRE. In some embodiments, a virtual representation can behave similarly to a user who created the MRE recording (e.g., a virtual representation can move around a physical environment similarly to how a user who created the MRE recording moved around a physical environment). In some embodiments, spatial content can be created without recording a user's movements. For example, spatial content can be at least partially simulated by a computer without requiring a user to physically perform actions to be recorded. In some embodiments, spatial content can be free of association with a physical environment. For example, spatial content intended for entertainment purposes can be configured to be played back in any physical environment. In some embodiments, spatial content can be configured to be adaptable to a variety of playback environments (e.g., spatial entertainment content can be configured to scale to the size of a user's living room). As used herein, a "SIG event" can refer to virtual content created at a spatial location that persists (permanently, semi-permanently, or for a limited amount of time) relative to that spatial location. A SIG event can include text, images, audio, video, interactive content, web links, or any other suitable information. A SIG recording can comprise one or more recorded SIG events.

Recording and playing back SIG events in a MRE can be beneficial in, for example, educational or entertainment applications. For example, an instructor could record a SIG event about safety procedures (e.g., proper methods to operate machinery or where personal protective equipment is stored) in a physical location where users may be working (e.g., in a warehouse). Users (e.g., new-hires) can then be present in a relevant physical location (e.g., the warehouse where they will be working) and view the SIG event in a MRE (e.g., new-hires can follow a virtual representation of an instructor around a physical warehouse as the virtual representation teaches proper safety procedures). In some embodiments, SIG events in a MRE can be more engaging to users than other virtual environments (e.g., watching a video on a 2D screen). In some embodiments, users can view or interact with a virtual environment simultaneously with a relevant physical environment (e.g., a user can view the SIG event while the user is in the physical environment where the SIG event was recorded), leading to greater feelings of engagement. Other methods of viewing a virtual environment (e.g., watching a video on a 2D screen) generally do not allow a user to simultaneously interact with the physical environment depicted in the video (e.g., because the user is watching the video from a different location than the location in which the video was recorded). It can therefore be desirable to develop systems and methods for increasing a user's engagement with a virtual environment by allowing the virtual environment to mix with the physical environment in a MRE.

Figure 5:
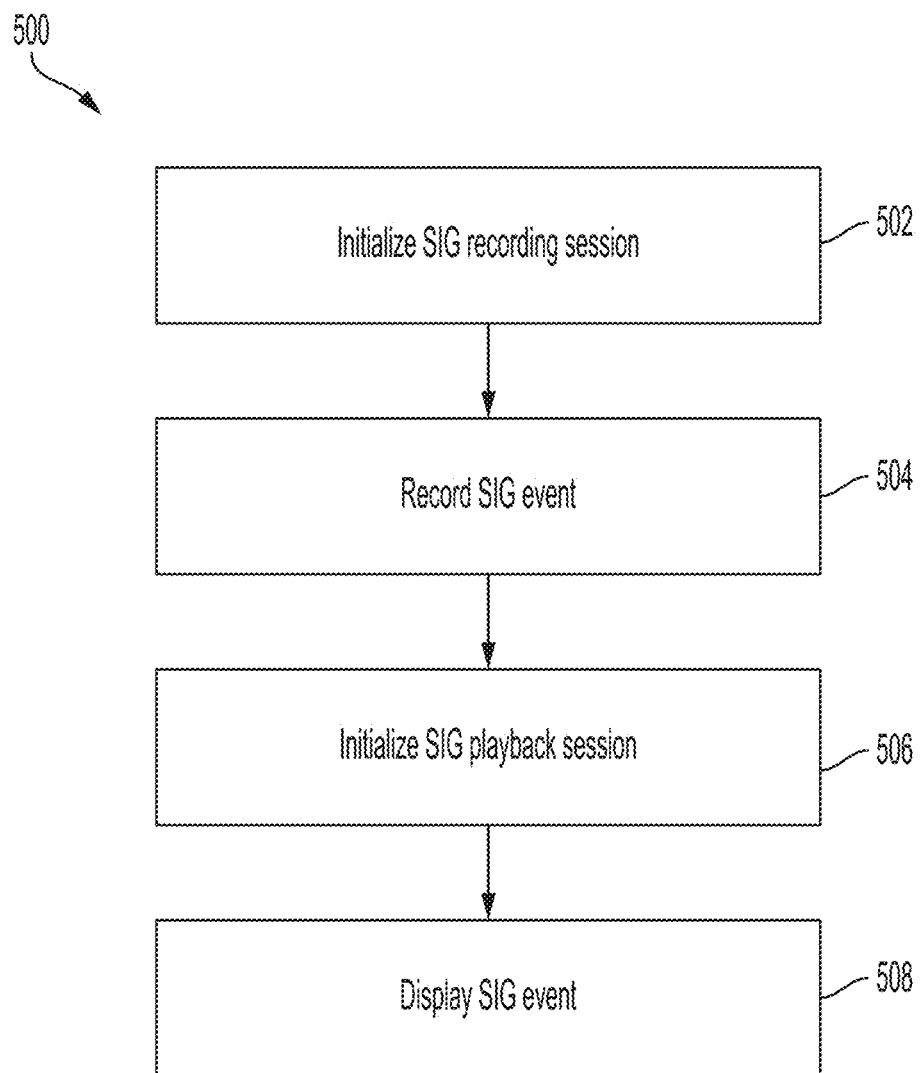
FIG. 5 illustrates an example flow chart of a process for creating and displaying spatial content in a mixed reality system.

FIG. 5 depicts a flow chart of an example usage of a SIG system. At step 502, a SIG recording session is initialized (e.g., a user can interact with a user interface to begin recording or set parameters for a recording session). At step 504, one or more SIG events are recorded. A SIG recording can incorporate data from one or more sensors on a wearable head device, which can include, e.g., a user's hand and head motions, audio signals, eye movement, location information, vital signs, or a spatial location. At step 506, a SIG playback session is initialized (e.g., a user can select which SIG recording to play back). At step 508, one or more SIG events are displayed in a SIG playback session (e.g., the SIG recording selected by a user can be played back to a user). In some embodiments, multiple users can join a single SIG playback session. Steps 502, 504, 506, and 508 of process 500 are described in more detail below.

Initializing SIG Recording

Figure 6:
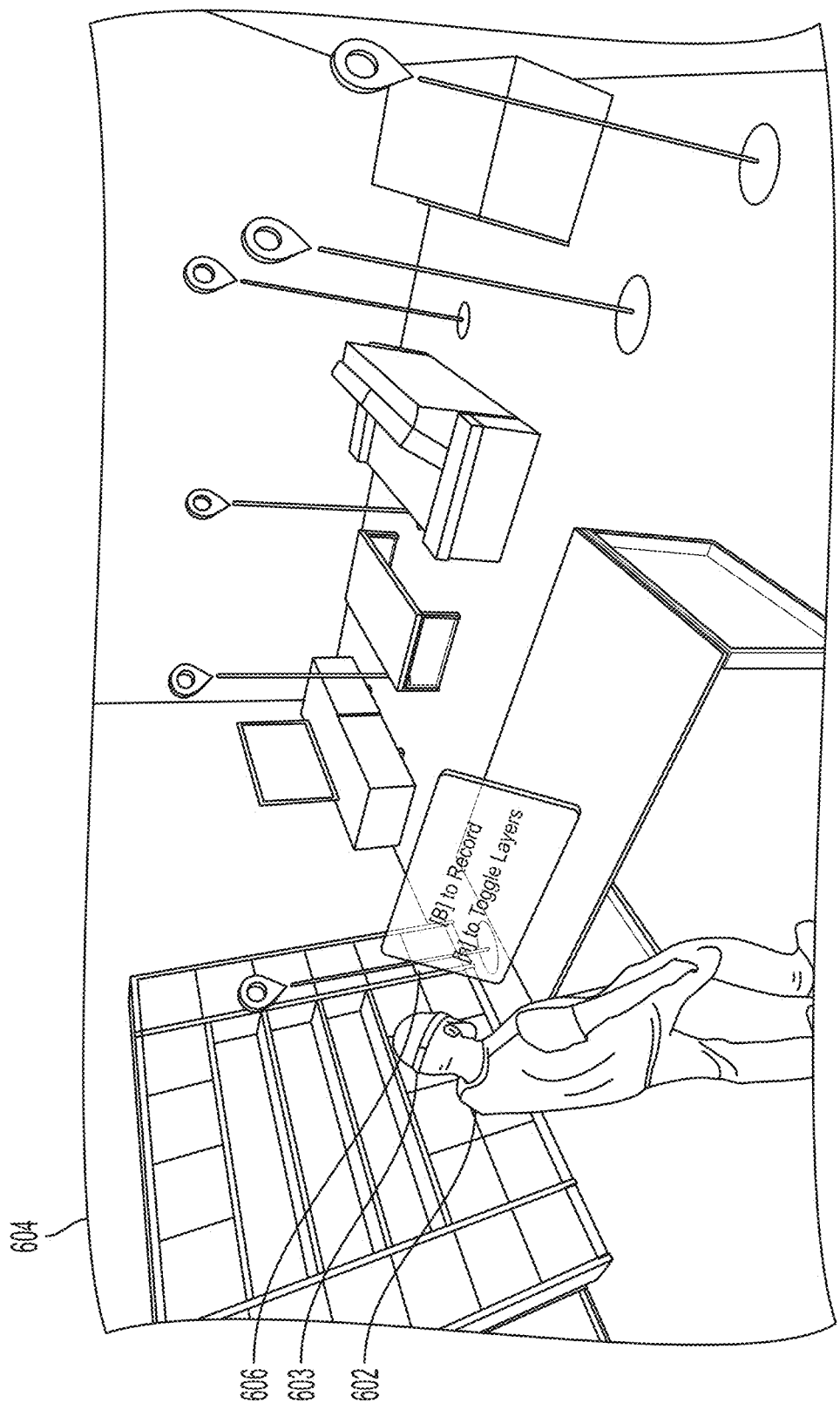
FIG. 6 illustrates an example of a user interacting with a prompt for creating or displaying spatial content in a mixed reality system.

FIG. 6 depicts an embodiment in which a SIG recording session is initialized. In the depicted embodiment, a user 602 can use a mixed reality system 603 (which may correspond to mixed reality systems 112 and 200), and the user 602 can be located in physical environment 604 (which can correspond to real environment 100). Mixed reality system 603 can be implemented via one or more mixed reality devices, such as a wearable head device (e.g., wearable head device 2102 described above); a handheld controller (e.g., handheld controller 300 described above), and/or an auxiliary unit (e.g., auxiliary unit 320 described above). In some embodiments, a user 602 can use a mobile device (e.g., a cell phone) to initialize a SIG recording session. In some embodiments, mixed reality system 603 can display virtual objects to user 602 (which can correspond to virtual environment 130) while simultaneously allowing user 602 to perceive the physical environment 604. In the depicted embodiment, mixed reality system 603 can display virtual menu 606 to a user. In some embodiments, virtual menus can be at least partially transparent such that a user can see through virtual menus to the physical environment behind the virtual menu. In some embodiments, virtual menus (and virtual objects generally) may not be transparent and may be such that the virtual menus (and virtual objects generally) appear to be part of a physical environment. In some embodiments, virtual menus can be generally fixed in place relative to a physical environment (e.g., virtual menu 606 is fixed above a table and is only perceivable when a user looks at that area in the physical environment). In some embodiments, mixed reality system 603 can use a coordinate system (which can correspond to coordinate system 108) and an origin point (which can correspond to origin point 106) to place virtual objects in a physical environment. In some embodiments, a coordinate system can define a shared coordinate space for both a physical environment and a virtual environment such that the same coordinates can be used to identify locations in both environments. In some embodiments, virtual menus can be generally fixed in place relative to a user's field of view. For example, a virtual menu can be generally fixed to the center of a user's field of view such that a virtual menu is always in the center of a user's field of view, regardless of where the user is looking. In some embodiments, virtual menus can display inertia when generally fixed to a location. For example, if a virtual menu is generally fixed to the center of a user's field of view, it may trail behind a user's changes in field of view such that it is not always at the center of a field of view. In some embodiments, virtual menus can then return to the center of a field of view once the field of view remains unchanged for a period of time.

In some embodiments, virtual menu 606 can display one or more options to a user (e.g., record a SIG event, toggle SIG layers, or begin a SIG event). In some embodiments, mixed reality system 603 can track a user's eye movements, and a user can select between one or more displayed options by looking at a particular option. In some embodiments, mixed reality system 603 can track a movement of a handheld controller (e.g., handheld controller component 300), which can be part of a mixed reality system, and a user may confirm a particular selection by pressing a button on the handheld controller (e.g., handheld controller component 300). However, other suitable selection methods may also be used (e.g., using buttons on a handheld controller to select and confirm options). In some embodiments, virtual menu 606 can display an option to record a SIG event. A user can select an option to record a SIG event, and a mixed reality system can, in response, display a prompt to a user (e.g., press a button to begin recording). In some embodiments, a user can provide an input to a virtual menu using a voice input.

In some embodiments, a remote user not physically at the mixed reality environment records or uploads a SIG event to a location of the mixed reality environment. That is, the SIG event can be uploaded to a virtual location associated with the remote user, even though the remote user's physical location is elsewhere. For example, the location associated with the remote user can be a virtual location on a display of a remote user device (e.g., a mobile device, a computer, a second wearable head device) presenting the mixed reality environment. The presentation of the mixed reality environment may be captured (e.g., recorded, streamed) using a first wearable head device at the mixed reality environment. The remote user may see the mixed reality environment (e.g., captured by the first wearable head device) through the display of the remote user device, and the virtual location on the display can correspond to a physical location of the first wearable head device sharing the view of the mixed reality environment. In addition to seeing the mixed reality environment, additional information about mixed reality environment may be displayed (e.g., a map of the environment, a menu of options, a grid indicating the first wearable head device's location). From the remote user's device, the remote user may record or upload a SIG event to a physical location at the mixed reality environment by selecting a corresponding virtual location. The SIG event can then be accessed in the mixed reality environment by other users of the mixed reality environment, whether they are physically present in the mixed reality environment, or remotely accessing the mixed reality environment. SIG events can comprise any suitable type of data, such as text files, audio files, video files, URLs, or social media content. SIG events can also comprise executable computer code, such as computer applications or scripts.

As an example, a first user may be in remote communication with a second user, accessing a wearable device, such that the first user can see a field of view provided by the second user. For instance, the first user may be remotely accessing the second user's view of a mixed reality environment. The second user's wearable device may be showing the first user her musical instrument collection. The first user may upload or record a SIG event (e.g., in this example, content associated with a musical instrument) to a location of the musical instrument on the display of the device, such that the SIG event becomes associated with the physical location of the musical instrument in the mixed reality environment. The second user can access the SIG event at the physical location. At a later time, a third user at the location of the musical instrument may access the SIG event recorded or uploaded by the first user. The third user may be at the physical location of the musical instrument; or the third user may be a remote user virtually present at the location of the musical instrument.

In some embodiments, the user at the virtual location (e.g., a remote user not physically at the mixed reality environment) records or uploads a SIG event without the presentation of the mixed reality environment from a wearable head device. For example, the location associated with the user is a virtual location on a map of the mixed reality environment, and based on the map of the mixed reality environment, the user records or uploads a SIG event to a location of the mixed reality environment. As another example, the user may define a coordinate in the mixed reality environment to record or upload a SIG event.

Figure 7:
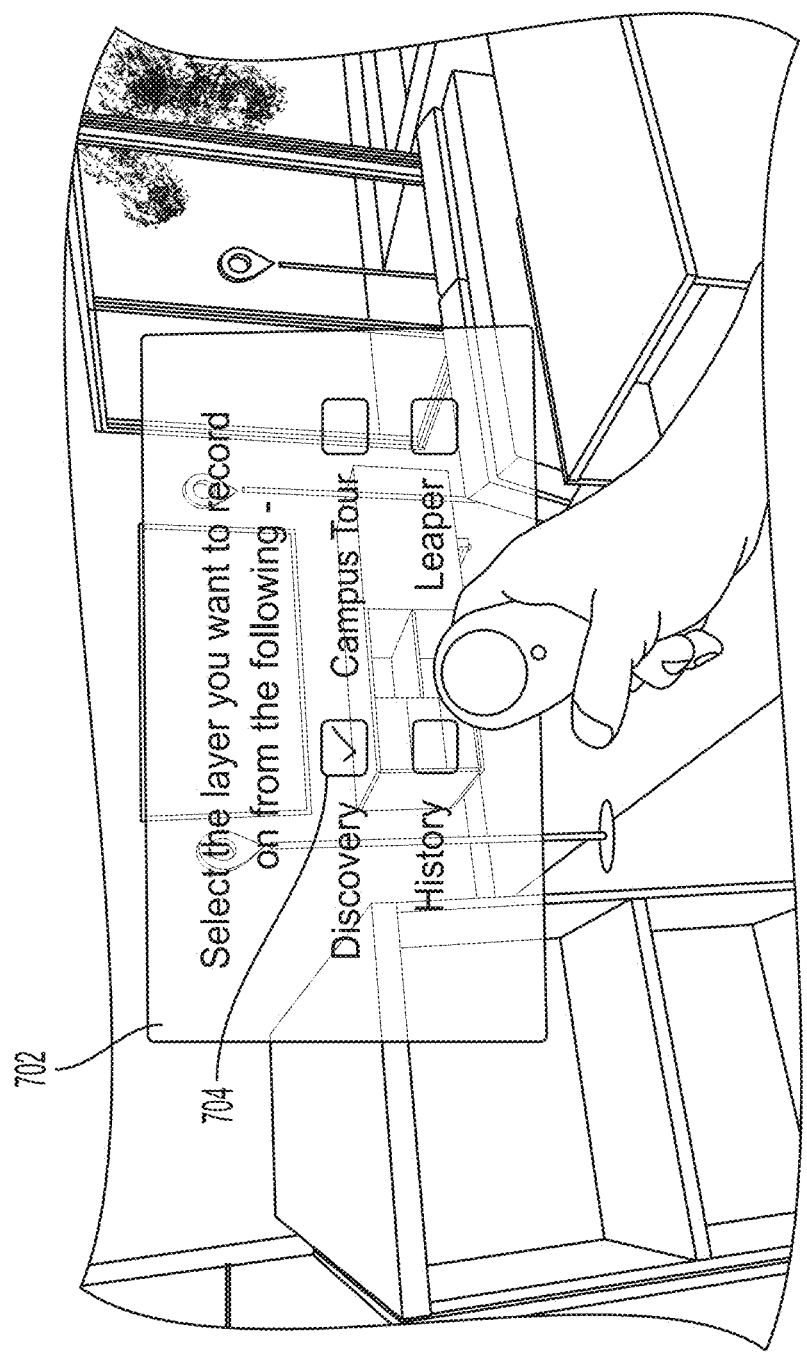
FIG. 7 illustrates an example of filtering spatial content in a mixed reality system.

FIG. 7 depicts an embodiment in which a user can choose to record a SIG event on a particular layer. In some embodiments, a mixed reality system presents virtual menu 702 to a user. In some embodiments, virtual menu 702 can be presented after a user has selected an option to record a SIG event. Virtual menu 702 can display one or more options 704 corresponding to one or more layers for recording a SIG event. Layers can serve as an organizational tool to arrange multiple SIG events. For example, layers can act as filters that selectively show or hide groups of information (e.g., SIG events or SIG recordings). In some embodiments, different layers can correspond to different educational orientation materials. For example, a "Discovery" layer can include SIG events about features in a dorm building. SIG events in the "Discovery" layer may teach users where a laundry room or a computer lab is, proper kitchen etiquette, or how to connect to campus wireless networks. In another example, a "Campus Tour" layer can include SIG events about buildings in a campus. One SIG event may be dedicated to touring an admissions office, and another SIG event may be dedicated to touring classrooms in an engineering building. In some embodiments, a user can choose from a pre-defined set of layers (e.g., one or more layers) to record on. In some embodiments, a user can add or delete layers from a presented list of layers. In some embodiments, SIG events can be automatically assigned to layers based on contextual information.

Although layers are described, it is also contemplated that SIG events (and other spatial content) can be filtered by other suitable means. For example, SIG events can be filtered by associated keywords. In some embodiments, SIG events can be filtered more granularly. For example, specific elements of a SIG event can be associated with a filter (e.g., a layer or one or more keywords). In some embodiments, toggling a filter can toggle one or more associated elements of a SIG event; and in some embodiments, toggling a filter off will not affect unassociated elements of a SIG event. For example, a virtual bar chart associated with a first layer can be displayed, and chart value descriptors can be associated with a second layer. The chart value descriptors can be additively overlaid over a virtual bar chart or not, depending on if an associated layer is toggled on or off. Filters can also be used by a user to select content the user wishes to view. For example, a user can toggle between different language filters or genre filters. In some embodiments, filters can be used to restrict a user's access to spatial content (e.g., content not suitable for children). For example, an administrator may allow only specific employees to access content associated with a specific filter. In some embodiments, filters can be associated with social media content (e.g., groups, friends, etc.).

Recording a SIG Event

Figure 8:
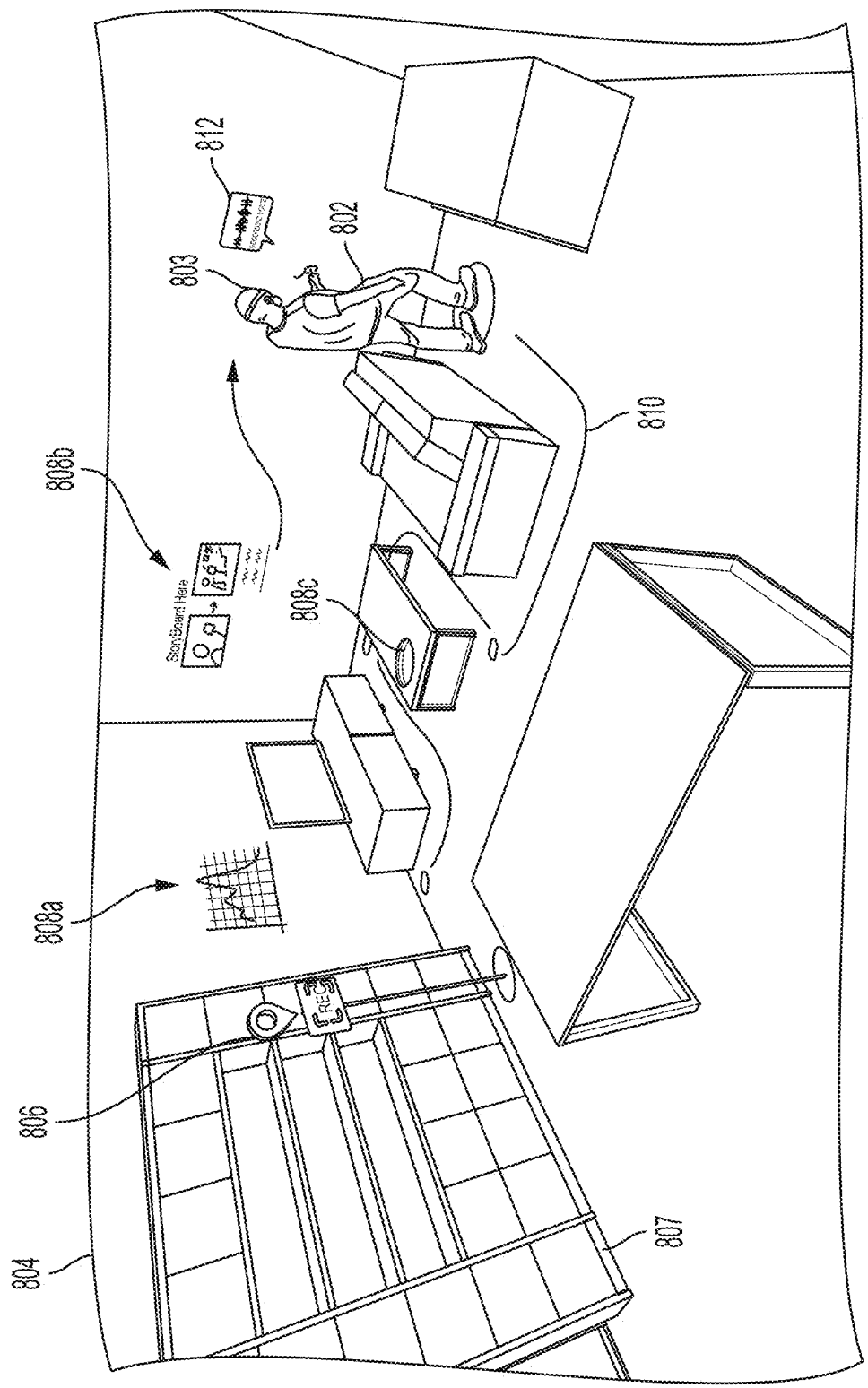
FIG. 8 illustrates an example of a user creating spatial content in a mixed reality system.

In some embodiments, once a user selects one or more layers to record on, a user can begin recording a SIG event as shown in FIG. 8. FIG. 8 depicts a user 802 using a mixed reality system 803 while located in physical environment 804 (which can correspond to real environment 100). In some embodiments, once a user begins recording a SIG event, virtual objects associated with the SIG event can be generated (which can correspond to virtual environment 130). In some embodiments, a virtual marker 806 can be placed where a user is located in a physical environment (e.g., using coordinate system 108). Virtual objects (e.g., virtual marker 806) can be generally fixed in position relative to a physical environment. For example, virtual marker 806 can be placed next to a set of shelves 807 in physical environment 804. A user using a mixed reality system can then see virtual marker 806 near shelves 807 when a user looks at the area with shelves 807. In some embodiments, virtual objects can persist in a location relative to a physical environment using a persistent coordinate system (which can correspond to coordinate system 108) as described herein with respect to FIGS. 1A-1C. In some embodiments, a coordinate system used for a physical environment can be the same as a coordinate system used for a virtual environment such that coordinates can described the same location in both the physical environment and the virtual environment.

Figure 9:
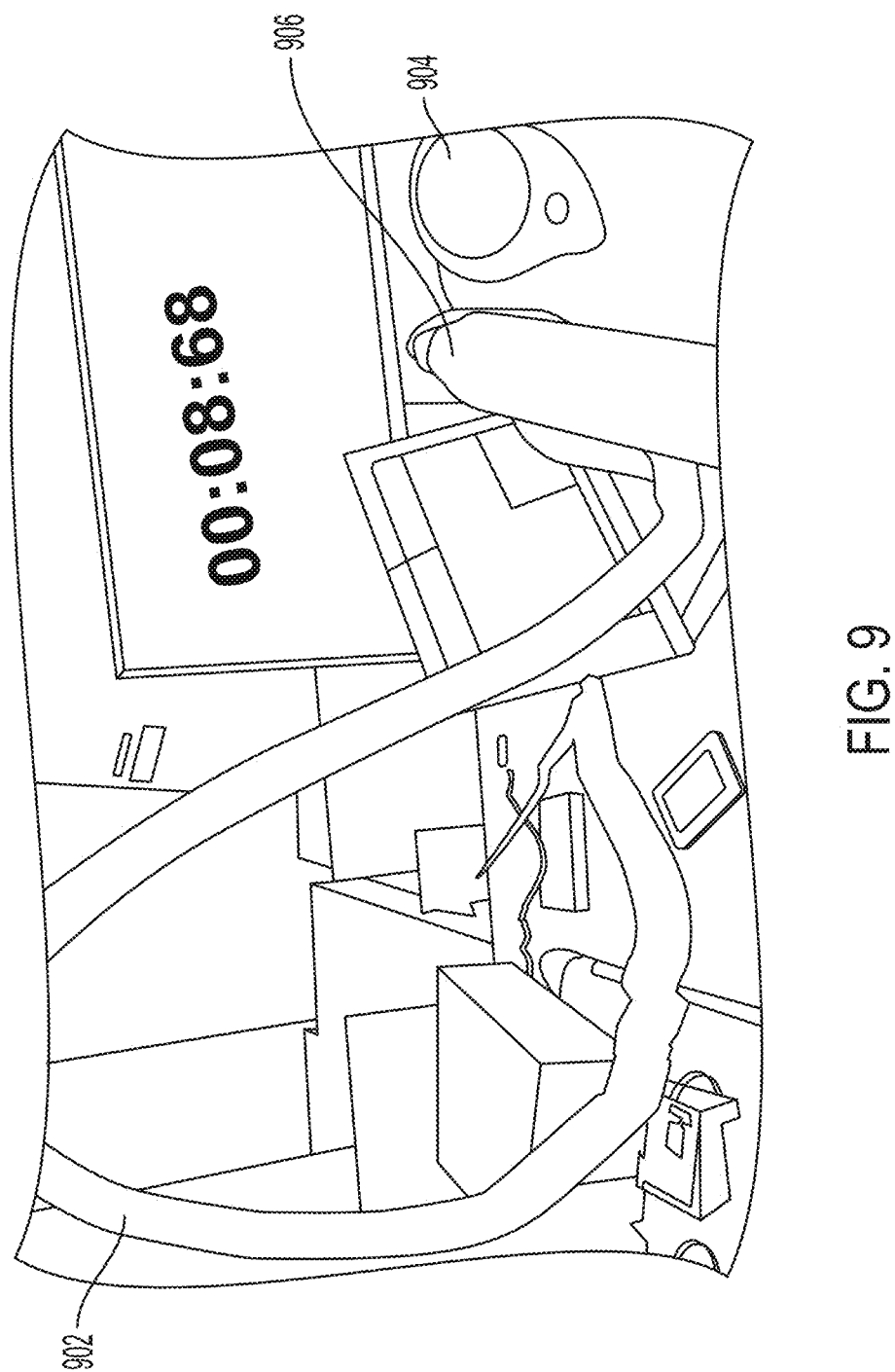
FIG. 9 illustrates an example of creating spatial content in a mixed reality system.

In some embodiments, a user can create virtual markings 808 while recording a SIG event. In some embodiments, the creation of virtual markings 808 (e.g., a user's movements while creating virtual markings 808) may be recorded. FIG. 9 depicts an example of a user creating a virtual marking 902. In some embodiments, a user can activate a marker function of a SIG system via any suitable means (e.g., pressing a button on a handheld controller 904 or selecting the function via a virtual user interface, or simply drawing with a user's hands without using a handheld controller). In some embodiments, when a marker function is active, a user can use a handheld controller 904 (which can correspond to handheld controller 300) to create virtual markings 902. In some embodiments, a mixed reality system can track a user's hand movements through movements of a handheld controller 904 through systems and methods described herein (e.g., with respect to FIG. 3A). In some embodiments, a user can depress and hold a button on a handheld controller 904 to "write" with a virtual marker 906. In some embodiments, a virtual marker 906 can be displayed during a recording session and overlaid on a handheld controller 904 when the handheld controller comes into a user's field of view. In some embodiments, a virtual controller and/or hand can be displayed (e.g., when a virtual marker is not engaged) during a recording session and overlaid on a handheld controller when the handheld controller comes into a user's field of view. In some embodiments, when a marker function is active, a user can use their hands to create virtual markings 902. In some embodiments, a mixed reality system can track a user's hand movement through various sensors (e.g., depth sensors, RGB cameras, other optical sensors, or motion sensors). In some embodiments, a user can activate a marker function by pointing with the user's hand. A virtual marker can be displayed and optionally overlaid on a user's hand when the hand is in a user's field of view to indicate a marker function is active.

In some embodiments, a virtual marking 902 will follow movements of a handheld controller 904 such that a user is "writing" with the handheld controller 904. In some embodiments, virtual markings can visually persist after a user creates the virtual markings. In some embodiments, virtual markings can visually persist only for a threshold amount of time within a SIG event after a user creates the markings. Virtual markings and their related visual persistence can be associated with a particular SIG playback session, such that virtual markings can reappear and again persist for a threshold amount of time if a SIG playback session is restarted or started for a different user. In some embodiments, virtual markings created more than a threshold amount of time ago can fade from a user's view. It is also contemplated that virtual markings can fade based on a threshold length of a virtual marking (e.g., virtual markings can have a threshold length of two feet). In some embodiments, virtual markings can be generally fixed with respect to a position within a physical environment.

Referring back to FIG. 8, in some embodiments, a virtual trail 810 around a physical environment can be recorded in a SIG recording. In some embodiments, a mixed reality system can track movements through a wearable head device, a handheld controller, or other suitable means (e.g., a combination of both) to determine a user's movements through a physical environment. Other sensors can be used as well (e.g., sensors in the physical environment). In some embodiments, a user's head movement and direction can be recorded in a SIG recording. In some embodiments, a mixed reality system can include a wearable head device capable of tracking a user's head movements and a direction a user is facing using systems and methods described herein with respect to FIGS. 2A-2D. Other sensors can be used as well (e.g., sensors in the physical environment). In some embodiments, audio signals (e.g., a user's speech) can be recorded in a SIG recording. For example, a mixed reality system can include microphones, which may be built into a wearable head device of the mixed reality system. Other microphones can be used as well (e.g., microphones fixed in a room). In some embodiments, a virtual audio marker 812 can be placed in a SIG recording. Virtual audio marker 812 can correspond to an audio recording, and can be generally fixed in position relative to a physical environment. In some embodiments, a video recording can be included in a SIG recording. For example, one or more cameras located on mixed reality system 112 or 200 (or external to a mixed reality system) can record a video during a SIG session. In some embodiments, the recorded video can be from a perspective of a user wearing a mixed reality system (i.e., the camera records what the user sees). In some embodiments, a mixed reality system can record an augmented video where the augmented video records both a physical environment and an overlaid virtual environment. In some embodiments, an augmented video can record what a user experiences in a mixed reality environment. In some embodiments, a video recorded in a SIG recording session can have an associated virtual video marker, which can be placed in a SIG recording. In some embodiments, a user can activate a video recording by approaching an associated virtual marker. In some embodiments, the recorded video may be of the user (e.g., the user's face including facial expressions, the user's body including gestures, etc.).

In some embodiments, a user can end a SIG recording session (e.g., by pressing a button on a handheld controller). In some embodiments, ending a SIG recording session can prompt a mixed reality system to display a virtual menu. In some embodiments, the virtual menu can indicate a length of the recorded SIG event. In some embodiments, the virtual menu can present options to publish a SIG recording or to delete a SIG recording. In some embodiments, the virtual menu can present an option to preview the recorded SIG event. In some embodiments, the preview option can allow a user to watch the recorded SIG event in the same way that other users (e.g., users that did not create the SIG event) can experience the SIG recording. A SIG recording comprising one or more SIG events can include one or more virtual objects, recordings, points, and/or markers. For example, a single SIG event can include one or more virtual markings, audio recordings, and/or video recordings.

Figure 10:
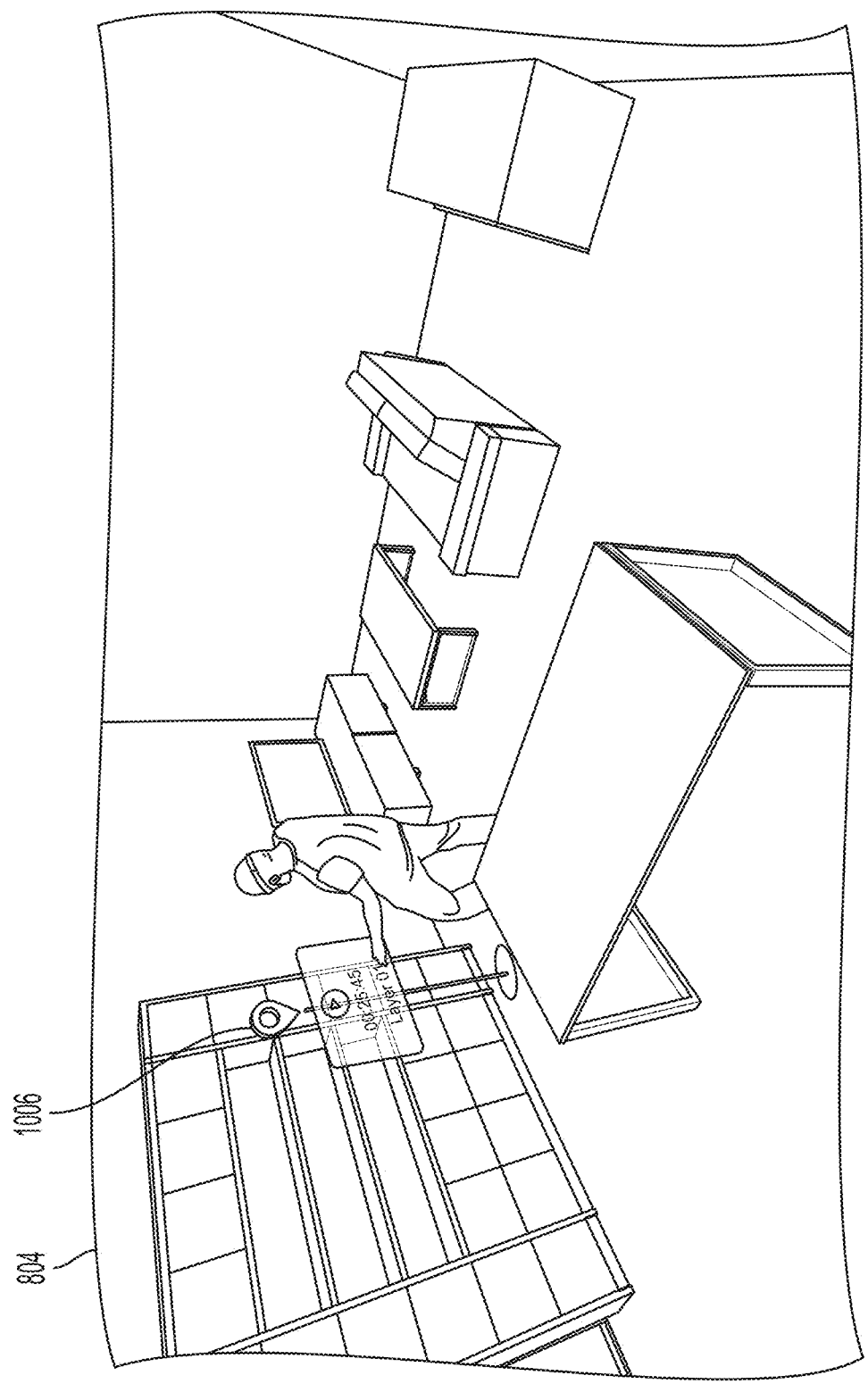
FIG. 10 illustrates an example of creating spatial content in a mixed reality system.

In some embodiments, a virtual marker 1006 can be created after a user publishes a recorded SIG event, as shown in FIG. 10. In some embodiments, virtual marker 1006 can be generally fixed in position relative to a physical environment 804. In some embodiments, virtual marker 1006 can be located at a location where a user began recording a corresponding SIG event. In some embodiments, virtual marker 1006 can display a length of a recorded SIG event and corresponding layer information. In some embodiments, a virtual marker 1006 can be color-coded according to a layer associated with a recorded SIG event. In some embodiments, a virtual marker can reflect an associated context or filter. For example, a virtual marker corresponding to a SIG event associated with a video layer could be a remote controller. In another example, a virtual marker corresponding to a SIG event associated with a wizard layer could be a wand.

Initializing SIG Playback

In some embodiments, a user can receive a notification (e.g., on a mobile device) after a recorded SIG event has been published. In some embodiments, a notification can include information regarding a user who published the recorded SIG event. In some embodiments, a notification can include information regarding a layer the SIG event was recorded on. In some embodiments, a notification can include information (e.g., GPS coordinates, directions) regarding a location at which the SIG event. In some embodiments, a notification can include information regarding when a SIG event was recorded. In some embodiments, a mixed reality system can receive a notification and display a virtual walking route to a newly recorded SIG event. In some embodiments, only users within a specific area may receive a notification of a recorded SIG event (e.g., users within a threshold radius of a location of a recorded SIG event).

Figure 11:
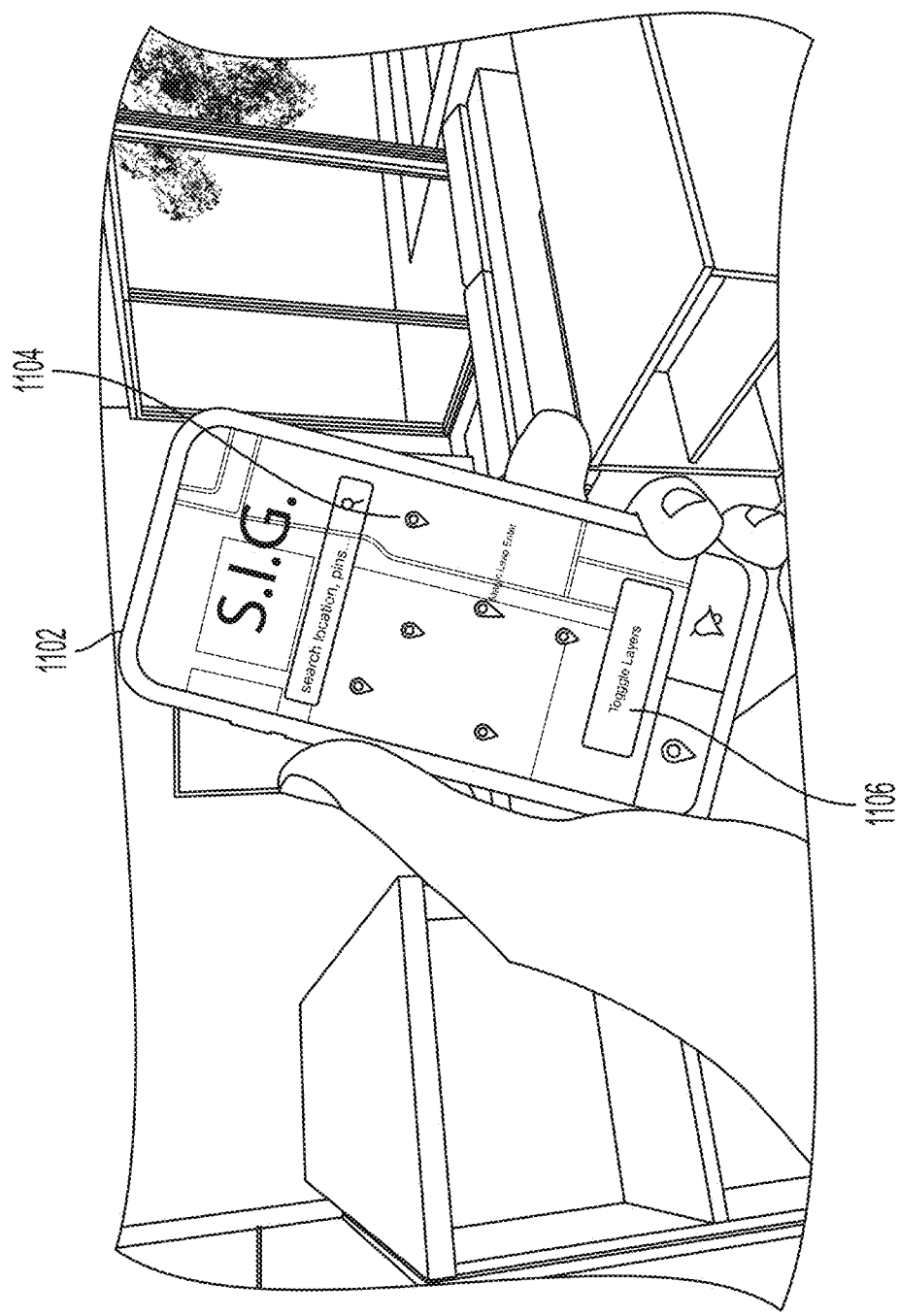
FIG. 11 illustrates an example of displaying information about spatial content in a mixed reality system.

FIG. 11 depicts an example application running on a mobile device 1102. In some embodiments, selecting a notification about a published SIG event can open an application (e.g., the application depicted in FIG. 11). In some embodiments, an application can display a map with markers 1104. Markers 1104 can correspond to recorded SIG events. In some embodiments, marker 1104 can be placed at a location where a recorded SIG event can be played back (e.g., where the SIG event recording began). In some embodiments, an application can display markers associated with one or more layers. In some embodiments, an application can present an option 1106 to toggle one or more layers on or off.

In some embodiments, a mobile device can be coupled to a mixed reality system. In some embodiments, a mobile device can present a scannable code (e.g., a barcode or a QR code), which a mixed reality system can scan with one or more cameras to pair with a mobile device. However, other coupling mechanisms are also envisioned, like wired methods (e.g., via a cable connecting a mobile device to a mixed reality system) or wireless methods (e.g., via Bluetooth or near-field communication). In some embodiments, a mobile device (or other suitable computing device) can edit metadata associated with a SIG event. In some embodiments, a mobile device (or other suitable computing device) can associate a SIG event with another SIG event. For example, SIG events can be linked sequentially to play after a prior SIG event completes. SIG events can also be linked in other structures, like a tree structure (e.g., a single SIG starting point can end with different SIG event endings).

Figure 12:
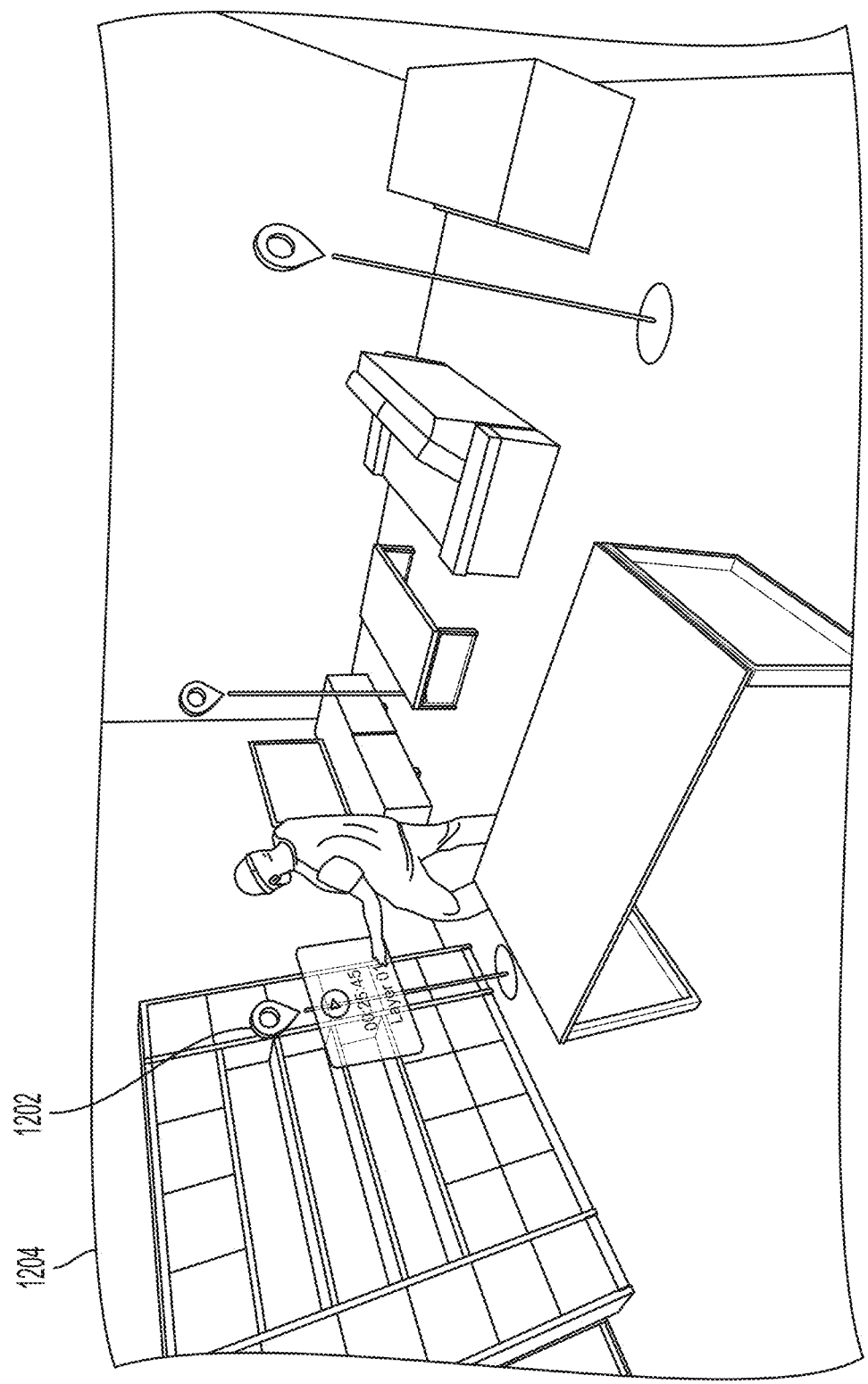
FIG. 12 illustrates an example of a user selecting spatial content in a mixed reality system.

In some embodiments, a user can travel to a physical location corresponding to a marker 1104 displayed on mobile device 1102. FIG. 12 depicts an embodiment where a user wearing a mixed reality system is in a physical location 1204 (which can correspond to physical location 804). A mixed reality system can display one or more virtual markers 1202. In some embodiments, as a user physically approaches a location of a virtual marker, the virtual marker can display information corresponding to the virtual marker (e.g., a recording length of a corresponding SIG recording or layer information about a corresponding SIG recording). In some embodiments, a virtual marker can display information corresponding to a virtual marker according to a user's eye movements (e.g., a virtual marker may display additional information only when a user is looking at the virtual marker).

In some embodiments, a virtual marker can correspond to a physical location where a user created a SIG recording. In some embodiments, a virtual marker can be placed in a location other than a recording location (e.g., a virtual marker for simulated spatial content that is not associated with a physical location can be placed anywhere). In some embodiments, virtual markers can be placed within a virtual environment. For example, a virtual environment can include a miniaturized theme park, which can be sized to fit within a user's living room. Virtual markers corresponding to spatial content can be placed within the virtual environment (e.g., within the theme park). A user can activate a virtual marker by approaching the virtual marker within the virtual environment.

SIG Playback

Figure 13:
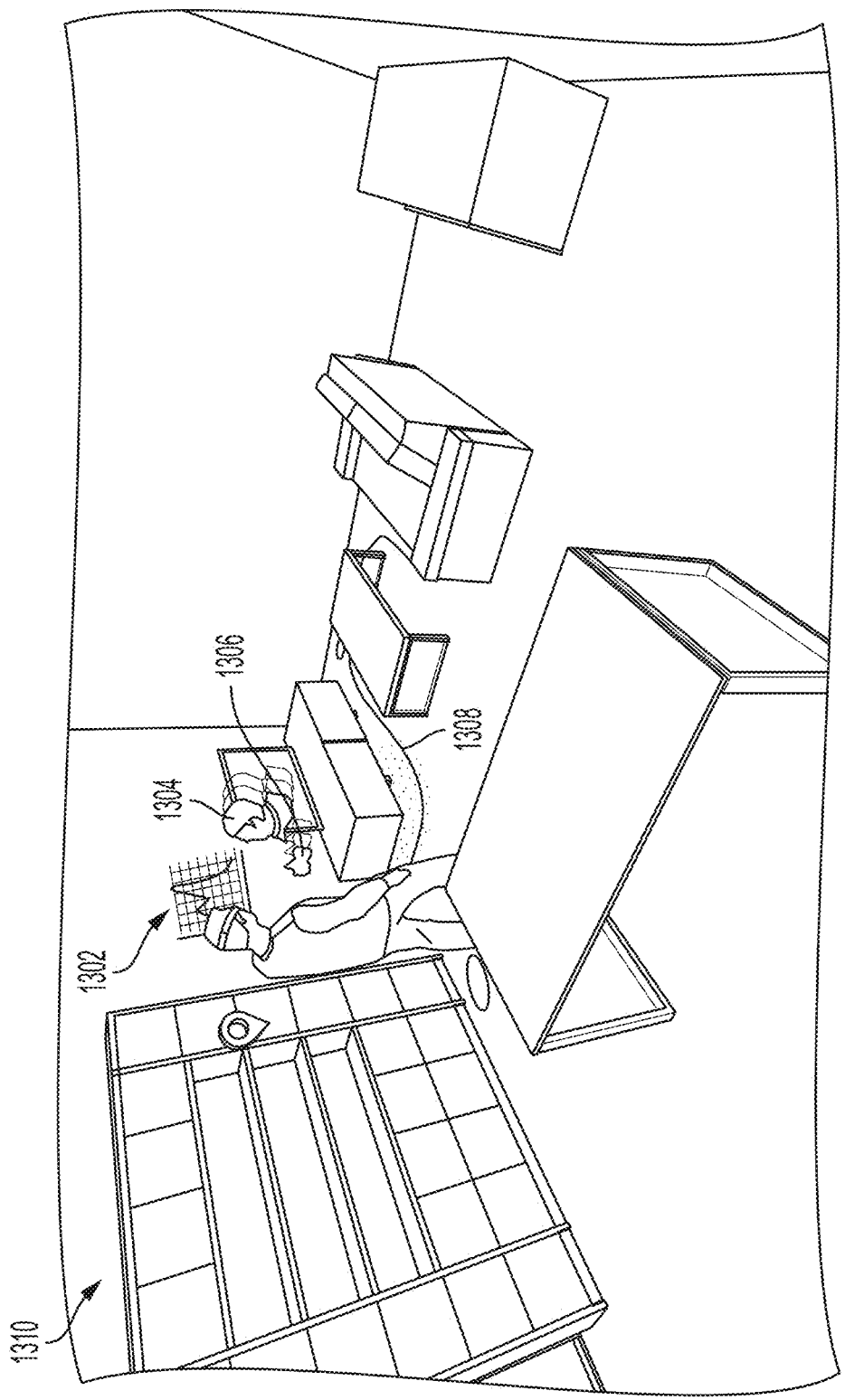
FIG. 13 illustrates an example of a user viewing spatial content in a mixed reality system.

FIG. 13 depicts an embodiment where a user has initiated playback of a SIG recording. In some embodiments, a user can initiate playback of a SIG recording by approaching a virtual marker and then selecting a playback option via a suitable means (e.g., pressing a button on a handheld controller, using a voice input). In some embodiments, once a user has begun a SIG playback session, all virtual markers that do not correspond to the selected SIG event can disappear. In some embodiments, a mixed reality system can display a virtual representation 1304. A virtual representation can be a representation of a user who recorded a SIG event and can be based on a user's tracked movements during the SIG recording session. In some embodiments, a virtual hand 1306 can also be displayed as part of a virtual representation. In some embodiments, a virtual hand can be based on a handheld controller operated by a user who recorded a SIG event, and a virtual hand can be based on tracked movements of a handheld controller. In some embodiments, a virtual hand can be based on one or more hands of a user who recorded a SIG event, and a virtual hand can be based on tracked movements of the one or more hands of a user who recorded a SIG event. In some embodiments, a SIG playback session can function as a video recording that can be overlaid over a physical environment where the video recording occurred.

In some embodiments, a mixed reality system can display a virtual representation moving around a physical location 1310 (which can correspond to physical location 1204). In some embodiments, a virtual representation can mimic movements of a user who recorded a SIG event. For example, a mixed reality headset can track the position and orientation of a recording user's head, hands, and/or other body parts. As a recording user moves around a physical location and looks around, a virtual representation can be created that moves and looks around in an approximately similar manner as the recording user. In some embodiments, a mixed reality system can display a virtual representation 1304 creating virtual markings 1302 in an approximately similar manner as a recording user created virtual markings during a recording session. In some embodiments, a mixed reality system can display a virtual trail 1308. In some embodiments, a virtual trail indicates a previous location of a virtual representation. In some embodiments, a virtual trail can facilitate following a virtual representation around a physical location during a SIG playback session. In some embodiments, a SIG playback session can pause if a distance between a user and virtual content is greater than a customizable threshold. The threshold can be either static (e.g., a set distance in feet) or dynamic (e.g., varying with the size of a virtual object).

In some embodiments, a virtual marker can display one or more completion indications if a user has played back a SIG recording associated with that virtual marker. In some embodiments, a virtual marker can indicate if a user has only partially completed a SIG playback session. In some embodiments, a virtual marker can indicate if a user has not started a SIG playback session.

Figure 14:
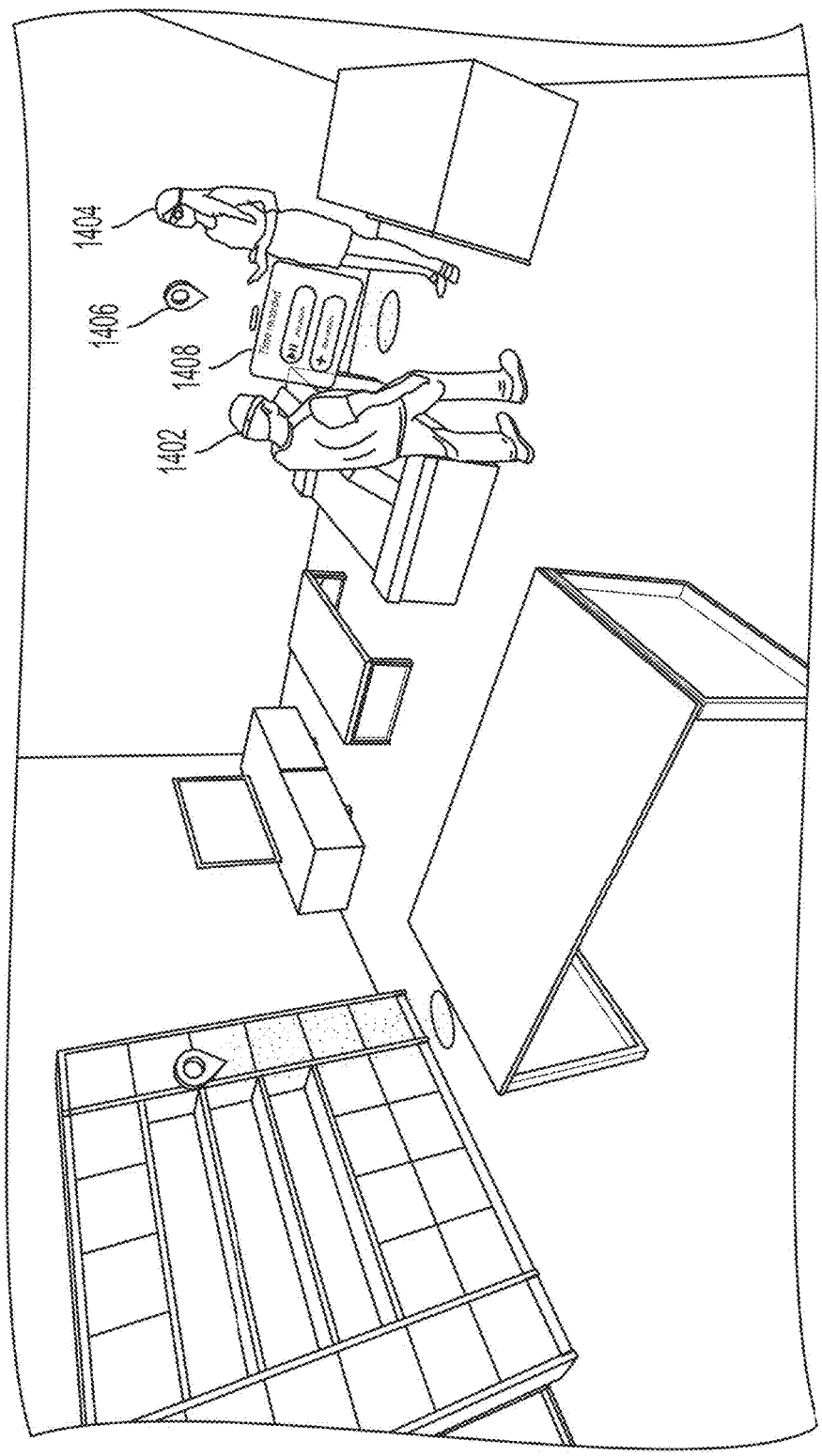
FIG. 14 illustrates an example of sharing spatial content in a mixed reality system.

FIG. 14 depicts an embodiment where multiple users can join a single SIG playback session. In the depicted embodiment, user 1402 approaches a virtual marker 1406. In the depicted embodiment, user 1404 has already initiated a SIG playback session corresponding to virtual marker 1406. In the depicted embodiment, both users 1402 and 1404 can use a mixed reality system. In some embodiments, as user 1402 approaches a virtual marker 1406 when another user has already initiated a playback session corresponding to that virtual marker, virtual marker 1406 can display to user 1402 a virtual menu 1408. In some embodiments, a virtual menu 1408 can include an option to join an existing session or an option to begin a new session. In some embodiments, a virtual menu 1408 can display how much time is remaining or has passed in an existing playback session. In some embodiments, selecting an option to begin a new session can initiate a separate SIG playback session that is not synchronized with another user. In some embodiments, selecting an option to begin a new session will begin the SIG playback session at the beginning of the recorded SIG event. Virtual markers can be associated with one or more display parameters, such as parameters that determine aspects of the presentation of the virtual markers. As one example, a display parameter can specify that a virtual marker be presented at an orientation relative to the user's view axis.

Figure 15:
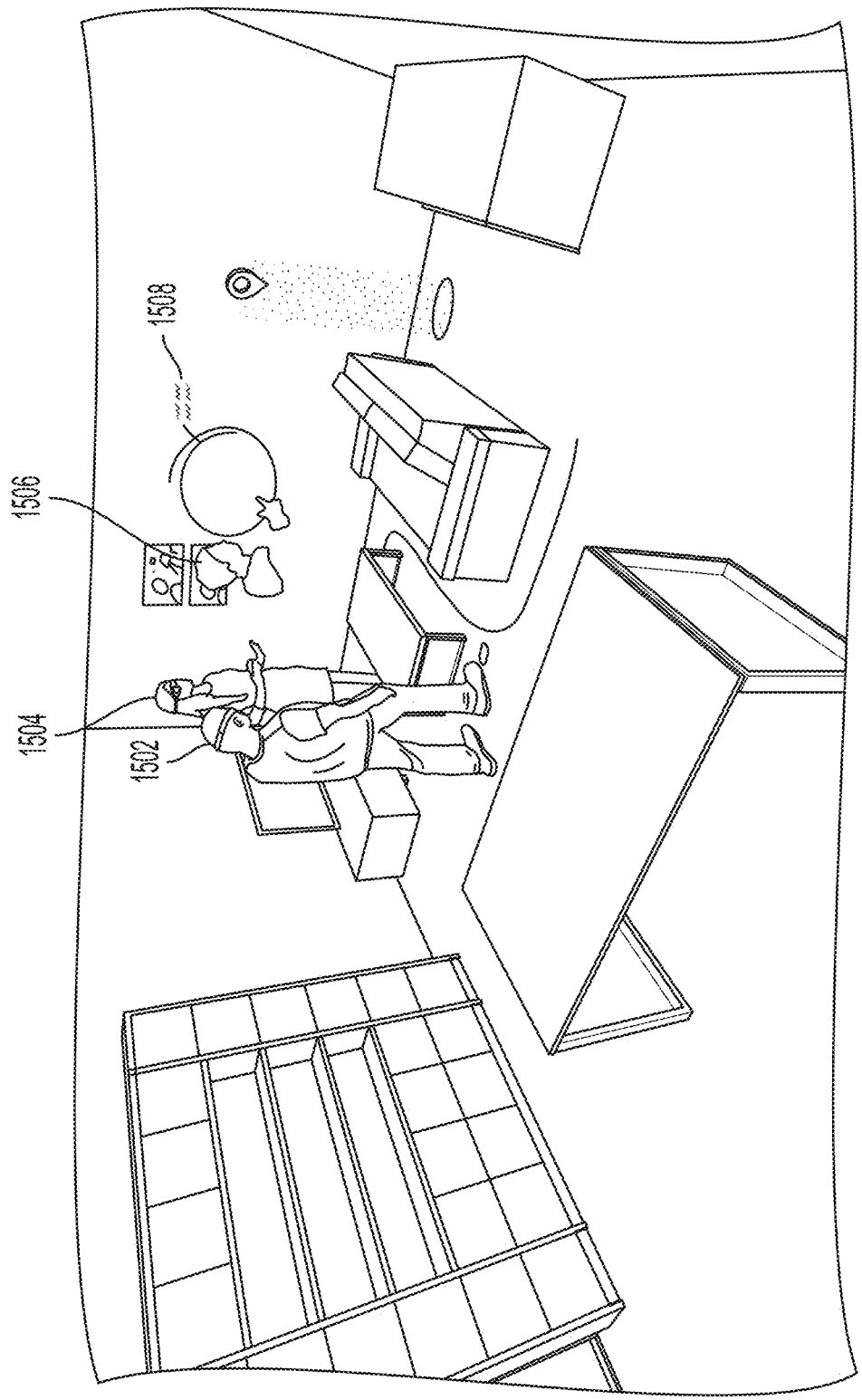
FIG. 15 illustrates an example of sharing spatial content in a mixed reality system.

FIG. 15 depicts an embodiment where a user elected to join an existing SIG playback session. In some embodiments, a mixed reality system can synchronize a SIG playback session with another SIG playback session. For example, if user 1502 elects to join an existing SIG playback session already initiated by user 1504, user 1502's mixed reality system can begin a SIG playback session such that user 1502's SIG playback session begins at the current time of user 1504's SIG playback session, instead of at the beginning of the SIG recording. In some embodiments, user 1502 and 1504 can view virtual representation 1506 move and create virtual markings 1508 in a synchronized manner. In some embodiments, a synchronized playback session can account for individual user's perspective of a synchronized SIG playback. For example, a user standing to the left of a virtual representation can see a left side of the virtual representation, and a user standing to the right side of a virtual representation can see a right side of the virtual representation, even though the virtual representations displayed to each user are time-synced to each other.

In some embodiments, synchronized SIG playback sessions can facilitate group activities. For example, a group of newly-hired employees can go through a training session together if each employee joins the same SIG playback session. In some embodiments, it can be beneficial for users to experience the same SIG playback session at the same time to facilitate interactions between users (e.g., users can talk to each other about the training materials as they watch).

SIG Network

In some embodiments, a network can include one or more mobile devices. In some embodiments, a network can organize one or more mobile devices into one or more groupings. In some embodiments, a user can choose to publish a SIG recording to one or more groupings such that mobile devices within the one or more groupings receive a notification, but mobile devices outside of the one or more groupings do not. In some embodiments, only mobile devices within the one or more groupings that a SIG recording was published to can view the SIG recording. In some embodiments, a grouping can be based on users, rather than devices (e.g., an authorized user can view a SIG recording on any of the user's devices). In some embodiments, social media features can be integrated. For example, SIG recordings can be published directly to social media websites. In another example, social media groupings (e.g., friends) can be inherited from a social media website using, for example, an API. A SIG recording can then be published to a particular social media grouping.

In some embodiments, spatial content can be shared across different platforms. For example, spatial content created on a mixed reality system can be shared to a non-mixed reality computer system. In some embodiments, spatial content can generate a virtual environment based on a physical environment and add virtual content to that virtual environment. A benefit of doing so includes expanding the audience for spatial content to users that may not have access to a mixed reality system. A user could view spatial content on, for example, a 2D screen.

In some embodiments, spatial content can be stored on a mixed reality system. In some embodiments, a mixed reality system can communicate with a server and transfer the SIG recording to a server. In some embodiments, a SIG recording can be stored on a mobile device as an intermediary between a mixed reality system and a server (e.g., a mixed reality system transfers a SIG recording to a mobile device, which then transfers a SIG recording to a server). In some embodiments, a mixed reality system is in communication with a mobile device during the SIG recording session such that the SIG recording is first stored on a mobile device. In some embodiments, a mixed reality system is in communication with a server during the SIG recording session such that the SIG recording is first stored on a server. In some embodiments, a server can provide a SIG recording to a mobile device for use in a SIG playback session. In some embodiments, a server can provide a SIG recording to a mixed reality system for use in a SIG playback session. It is also contemplated that other network topologies (e.g., peer to peer networking or ad-hoc networks of mixed reality devices) can be used as well.

Determining a Location for a SIG Recording

FIG. 16 illustrates an example process 1600 for determining a location for a SIG recording. At step 1602, an initial location for a SIG recording can be estimated. An initial estimation can be obtained while a user records a SIG event. For example, a user using a mixed reality system 603 can record a SIG event, and during the recording, mixed reality system 603 can estimate an initial location for the SIG event. Mixed reality system 603 can estimate an initial location using any suitable method. In some embodiments, such as where mixed reality system 603 is equipped with a GPS sensor, the initial location can be identified based on GPS coordinates of the mixed reality system 603.

In some embodiments, a remote user not physically at the mixed reality environment records or uploads a SIG event to a location of the mixed reality environment. That is, the SIG event can be uploaded to a virtual location associated with the remote user, even though the remote user's physical location is elsewhere, as described herein.

In some embodiments, such as where mixed reality system 603 lacks GPS functionality, other methods of localizing SIG events can be used. For instance, in some embodiments, mixed reality system 603 can use known locations for wireless access points to identify (e.g., via triangulation) a location using, for example, received signal strength indication, fingerprinting, angle of arrival, and/or time of flight techniques. In some embodiments, a position of the SIG event relative to mixed reality system 603 may be known or determined. A location for a wireless access point can be determined, for example at the time of installation of the wireless access point, using a device that can detect the wireless access point while using GPS to determine a location of the device. In some embodiments, the device may be a device, such as a mobile phone, in communication with mixed reality system 603. The location can then be associated with the wireless access point. In some embodiments, a mixed reality system 603 can directly use GPS signals from nearby devices to estimate an initial location for a SIG event. In some embodiments, a mixed reality system 603 can use known locations for cellular base stations to identify a location. In some embodiments, mixed reality system 603 can use known locations for a 5G base station to identify a location. For example, a 5G base station can have a known location, and a location of mixed reality system 603 can be determined relative to the 5G base station (e.g., by determining a vector from a 5G base station to mixed reality system 603 through beamforming).

In some embodiments, a location can be estimated visually, for example, using object recognition of a "landmark" object with a known location. For example, while recording a SIG event, mixed reality system 603 can recognize one or more rooms that have associated location information (which may have been previously determined). Mixed reality system 603 can use the associated location information of one or more recognized objects (e.g., tables, chairs, corners, etc.) to determine an initial location estimate for a SIG recording. In some embodiments, objects can be tagged (e.g., with a QR code or a bar code) such that location information for the objects is embedded in the tag; the tag, and thus the embedded location information for the object, can be detected with a camera of mixed reality system 603.

Other methods for estimating an initial location for a SIG recording can also be used. In some embodiments, a different device in communication with mixed reality system 603 can be used to estimate an initial location for a SIG recording. For example, a mobile device in communication with mixed reality system 603 can estimate its location using wireless access points, GPS signals, cellular base stations, 5G base stations, and/or recognized objects. The location of the mobile device can then be associated with the SIG recording. If the mobile device is located near mixed reality system 603 (e.g., the user of mixed reality system 603 is carrying the mobile device), the location of the mobile device can be directly associated with the SIG recording. If the mobile device is located away from mixed reality system 603, its location can be used alone or with other information (e.g., wireless access points, GPS, cellular base stations, 5G base stations, and/or recognized objects) to estimate an initial location of a SIG recording. In some embodiments, a location estimated for a SIG recording can include position data (e.g., longitude and latitude coordinates) as well as an accuracy estimate. The accuracy estimate can include, for example, a radius estimated to contain a location to with certain degree of confidence. In some embodiments, a position of mixed reality system 603 relative to the mobile device may be known or determined.

At step 1604 of the example process shown in FIG. 16, a SIG recording can be accessed. For example, a user can play back a SIG recording using a mobile device or a mixed reality system. In some embodiments, a user can be prompted to access a SIG recording, or a SIG recording may automatically begin playing. For example, a user may walk near a location that has an associated SIG recording. The user may be notified (e.g., through the user's mobile device or a mixed reality system) that a SIG recording exists at or near the user's location, and the user may be prompted to view the SIG recording, or the SIG recording may begin playing automatically. In some embodiments, a SIG recording with an associated location can be loaded (e.g., pushed) on a user's device (e.g., from a remote server) if a user is at or near the associated location (e.g., within a certain radius of the associated location).

In some embodiments, the SIG recording's associated location can be the estimated initial location determined at step 1602. At step 1606, a mobile device can estimate its own location (e.g., during a playback session) using any suitable methods, including but not limited to: triangulation using wireless access points, GPS signals, cellular base stations, 5G base stations and/or recognized objects. Similarly, mixed reality system 603 can also be used to play back a SIG recording, and mixed reality system 603 can estimate its location using any suitable means. A new location estimate and a new accuracy estimate associated with the new location estimate can be stored on a mobile device, a mixed reality system, and/or on a server communicatively coupled to a mobile device or a mixed reality system.

At step 1608, a location of a SIG recording can be updated. In some embodiments, a new location estimate determined at step 1606 can be more accurate than an initial location estimate determined at step 1602. For example, an initial location determined at step 1602 can be estimated using triangulation from wireless access points, which can produce a location estimate with a poor accuracy (e.g., a large radius to be confident in the location). A mobile device can produce a more accurate location estimate at step 1606 by using more accurate location methods (e.g., using GPS signals). In some embodiments, a location associated with a SIG recording can be updated to a more accurate location. For example, at step 1608, a determination can be made regarding the accuracy of two or more location estimates (e.g., identifying which location estimate has the smallest confidence radius). A location estimate with the highest accuracy can be associated with a SIG recording and can be used to share the SIG recording. For example, a location estimate with the highest accuracy can be used to notify a user when a user walks near the location estimate with the highest accuracy. A location estimate with the highest accuracy can also be used to mark a SIG recording on a map so that a user can navigate to a SIG recording.

In some embodiments, one or more location estimates determined at steps 1602 or 1606 can be combined to update a location of a SIG recording. For example, one or more location estimates can be averaged to form a combined location estimate, and the combined location estimate can be used to share a SIG recording. In some embodiments, one or more location estimates can be weighted to form a combined location estimate. In some embodiments, a location estimate with a higher estimated accuracy can be more heavily weighted than a location estimate with a lower estimated accuracy. In some embodiments, a location estimate that is newer in time can be more heavily weighted than a location estimate that is older in time.

In some embodiments, steps 1604, 1606, and 1608 can be performed each time a SIG recording is accessed. For example, each time a mobile device or a mixed reality system plays back a SIG recording, a background process can estimate a location for the mobile device or mixed reality system during the playback session. A location estimate can then be saved to the mobile device, the mixed reality system, and/or a server communicatively coupled to the mobile device or the mixed reality system. A location associated with the SIG recording can be updated based on new location estimates received (e.g., by selecting a location estimate with the highest accuracy, or by calculating a new weighted average based on a new location estimate).

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to one or more microphones) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech processing engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
   receiving, in a recording session at a first time, a first input from a first user, the first input indicative of a locomotion of the first user during the recording session;
   determining, using a sensor of a first wearable head device, a location associated with the first user at the first time in a coordinate space of a virtual environment;
   generating a persistent virtual content corresponding to the first input, the persistent virtual content comprising video of the locomotion of the first user, wherein the persistent virtual content is associated with the location associated with the first user at the first time;
   determining, at a second time, a first location of a second user at the second time in the coordinate space;
   determining, based on the location associated with the first user at the first time and the first location of the second user at the second time, whether to present the persistent virtual content to the second user;
   in accordance with a determination to present the persistent virtual content to the second user, presenting, via a display, the persistent virtual content to the second user;
   in accordance with a determination to not present the persistent virtual content to the second user, forgoing presenting the persistent virtual content to the second user,
   wherein the presenting the persistent virtual content to the second user comprises presenting, in a playback session later than the first time, the video of the locomotion of the first user at a location in the coordinate space corresponding to the location associated with the first user at the first time;
   determining, at a third time, whether a second location of the second user at the third time in the coordinate space is within a threshold distance from the first location of the second user;
   in accordance with a determination that the second location of the second user is not within the threshold distance, pausing the presenting the persistent virtual content; and
   in accordance with a determination that the second location of the second user is within the threshold distance, forgoing pausing the presenting the persistent virtual content.

2. The method of claim 1, wherein the first input comprises at least one of a head movement of the first user, a hand movement of the first user, and a handheld controller input.

3. The method of claim 1, wherein the sensor comprises at least one of a position sensor and a camera.

4. The method of claim 1, wherein the virtual content comprises a virtual marking.

5. The method of claim 1, wherein determining whether to present the persistent virtual content to the second user comprises determining, using a sensor of a second wearable head device, whether a field of view of the second user includes the location associated with the first user at the first time.

6. The method of claim 1, further comprising receiving a filter selection from the second user, wherein determining whether to present the persistent virtual content to the second user comprises determining whether the persistent virtual content is associated with the filter selection.

7. The method of claim 1, further comprising:
   determining a new location, wherein the new location is based on the location associated with the first user at the first time and based further on the first location of the second user at the second time; and
   associating the new location with the persistent virtual content.

8. The method of claim 7, further comprising:
   determining, at a fourth time, a location of a third user at the fourth time; and
   in accordance with a determination that the location of the third user is at the new location, presenting, in a second playback session, the persistent virtual content to the third user.

9. The method of claim 7, wherein the new location is further based on an accuracy of the location associated with the first user at the first time and an accuracy of the first location of the second user at the second time.

10. The method of claim 1, wherein the method further comprises, in accordance with the determination to not present the persistent virtual content to the second user:

determining whether a field of view of the second user includes the location associated with the first user at the first time; and in accordance with a determination that the field of view of the second user includes the location associated with the first user at the first time, presenting, in the playback session, a second content associated with the persistent virtual content.

11. The method of claim 1, further comprising:
while the persistent virtual content is presented to the second user in the playback session:
determining, at a fourth time, a location of a third user at the fourth time in the coordinate space; and
in accordance with a determination that the location of the third user is at the first location of the second user at the second time:
receiving an input from the third user; and
in response to receiving the input from the third user, presenting, in a second playback session, the persistent virtual content to the third user concurrently with presenting, in the playback session, the persistent virtual content to the second user.

12. The method of claim 1, wherein the location associated with the first user at the first time is a physical location of the first user in the coordinate space.

13. The method of claim 1, wherein the location associated with the first user at the first time is a virtual location of the first user in the coordinate space, the virtual location different from a physical location of the first wearable head device.

14. A system comprising:
a sensor; and
one or more processors configured to execute a method comprising:
receiving, in a recording session at a first time, a first input from a first user, the first input indicative of a locomotion of the first user during the recording session;
determining, using the sensor, a location associated with the first user at the first time in a coordinate space of a virtual environment;
generating a persistent virtual content corresponding to the first input, the persistent virtual content comprising video of the locomotion of the first user, wherein the persistent virtual content is associated with the location associated with the first user at the first time;
determining, at a second time, a first location of a second user at the second time in the coordinate space;
determining, based on the location associated with the first user at the first time and the first location of the second user at the second time, whether to present the persistent virtual content to the second user;
in accordance with a determination to present the persistent virtual content to the second user, presenting, via a display, the persistent virtual content to the second user;
in accordance with a determination to not present the persistent virtual content to the second user, forgoing presenting the persistent virtual content to the second user,
wherein the presenting the persistent virtual content to the second user comprises presenting, in a playback session later than the first time, the video of the locomotion of the first user at a location in the coordinate space corresponding to the location associated with the first user at the first time;
determining, at a third time, whether a second location of the second user at the third time in the coordinate space is within a threshold distance from the first location of the second user;
in accordance with a determination that the second location of the second user is not within the threshold distance, pausing the presenting the persistent virtual content; and
in accordance with a determination that the second location of the second user is within the threshold distance, forgoing pausing the presenting the persistent virtual content.

15. The system of claim 14, wherein the method further comprises:
determining a new location, wherein the new location is based on the location associated with the first user at the first time and based further on the first location of the second user at the second time; and
associating the new location with the persistent virtual content.

16. The system of claim 14, wherein the location associated with the first user at the first time is a physical location of the first user in the coordinate space.

17. The system of claim 14, wherein the location associated with the first user at the first time is a virtual location of the first user in the coordinate space, the virtual location different from a physical location of the first wearable head device.

18. A non-transitory computer-readable medium storing instructions that, when executed by one or more processors, cause the one or more processors to execute a method comprising:
receiving, in a recording session at a first time, a first input from a first user, the first input indicative of a locomotion of the first user during the recording session;
determining, using a sensor of a first wearable head device, a location associated with the first user at the first time in a coordinate space of a virtual environment;
generating a persistent virtual content corresponding to the first input, the persistent virtual content comprising video of the locomotion of the first user, wherein the persistent virtual content is associated with the location associated with the first user at the first time;
determining, at a second time, a first location of a second user at the second time in the coordinate space;
determining, based on the location associated with the first user at the first time and the first location of the second user at the second time, whether to present the persistent virtual content to the second user;
in accordance with a determination to present the persistent virtual content to the second user, presenting, via a display, the persistent virtual content to the second user;
in accordance with a determination to not present the persistent virtual content to the second user, forgoing presenting the persistent virtual content to the second user,
wherein the presenting the persistent virtual content to the second user comprises presenting, in a playback session later than the first time, the video of the locomotion of the first user at a location in the coordinate space corresponding to the location associated with the first user at the first time;

determining, at a third time, whether a second location of the second user at the third time in the coordinate space is within a threshold distance from the first location of the second user;

in accordance with a determination that the second location of the second user is not within the threshold distance, pausing the presenting the persistent virtual content; and in accordance with a determination that the second location of the second user is within the threshold distance, forgoing pausing the presenting the persistent virtual content.

19. The non-transitory computer-readable medium of claim 18, wherein the method further comprises:

determining a new location, wherein the new location is based on the location associated with the first user at the first time and based further on the first location of the second user at the second time; and associating the new location with the persistent virtual content.

20. The non-transitory computer-readable medium of claim 18, wherein the location associated with the first user at the first time is a physical location of the first user in the coordinate space.

* * * * *